(12) United States Patent
Zhao et al.

(10) Patent No.: US 12,219,135 B2
(45) Date of Patent: Feb. 4, 2025

(54) PICTURE PARTITIONING METHOD AND APPARATUS

(71) Applicant: HUAWEI TECHNOLOGIES CO., LTD., Shenzhen (CN)

(72) Inventors: Yin Zhao, Hangzhou (CN); Haitao Yang, Shenzhen (CN); Jianle Chen, San Diego, CA (US); Lian Zhang, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 18/360,639

(22) Filed: Jul. 27, 2023

(65) Prior Publication Data

US 2023/0370597 A1 Nov. 16, 2023

Related U.S. Application Data

(63) Continuation of application No. 17/734,829, filed on May 2, 2022, now Pat. No. 11,758,134, which is a
(Continued)

(30) Foreign Application Priority Data

Aug. 28, 2018 (CN) .......................... 201810990466.9
Sep. 25, 2018 (CN) .......................... 201811116761.8
(Continued)

(51) Int. Cl.
*H04N 19/119* (2014.01)
*H04N 19/132* (2014.01)
(Continued)

(52) U.S. Cl.
CPC ......... *H04N 19/119* (2014.11); *H04N 19/132* (2014.11); *H04N 19/176* (2014.11); *H04N 19/186* (2014.11)

(58) Field of Classification Search
CPC .......................... H04N 19/119; H04N 19/132
See application file for complete search history.

(56) References Cited

U.S. PATENT DOCUMENTS

2012/0230421 A1 9/2012 Chen et al.
2013/0195199 A1 8/2013 Guo et al.
(Continued)

FOREIGN PATENT DOCUMENTS

AU    2018233042 A1    4/2020
CN       1750658 A     3/2006
(Continued)

OTHER PUBLICATIONS

"Series H: Audiovisual and Multimedia Systems, Infrastructure of audiovisual services—Coding of moving video, High efficiency video coding," Recommendation of ITU-T H.265, ITU-T Telecommunication Standardization Sector of ITU, pp. 1-692, International Telecommunication Union, Geneva, Switzerland (Feb. 2018).
(Continued)

*Primary Examiner* — Jerry T Jean Baptiste
(74) *Attorney, Agent, or Firm* — Leydig, Voit & Mayer, Ltd.

(57) ABSTRACT

A picture partitioning method and apparatus are described. The method includes determining a split mode of a current node, where the current node includes a luma block and a chroma block. The method further includes determining, based on the split mode of the current node and a size of the current node, that the chroma block of the current node is not further split. In accordance with the chroma block of the current node not being further split, the method includes splitting the luma block of the current node based on the split mode of the current node. In accordance with the chroma block of the current node not being further split, the method may be used to split only the luma block of the current node, thereby improving encoding and decoding efficiency, reduc-
(Continued)

ing a maximum throughput of a codec, and facilitating implementation of the codec.

20 Claims, 11 Drawing Sheets

Related U.S. Application Data continuation of application No. 17/187,184, filed on Feb. 26, 2021, now Pat. No. 11,323,708, which is a continuation of application No. PCT/CN2019/103094, filed on Aug. 28, 2019.

(30) Foreign Application Priority Data

| Mar. 7, 2019 | (CN) | 201910173454.1 |
| Mar. 11, 2019 | (CN) | 201910183731.7 |
| Mar. 13, 2019 | (CN) | 201910191131.5 |
| Mar. 21, 2019 | (CN) | 201910219440.9 |
| Jul. 30, 2019 | (CN) | 201910696741.0 |

(51) Int. Cl.
*H04N 19/176* (2014.01)
*H04N 19/186* (2014.01)

(56) References Cited

U.S. PATENT DOCUMENTS

| 2014/0301437 A1 | 10/2014 | Wang |
| 2015/0208094 A1 | 7/2015 | Lee et al. |
| 2018/0270509 A1 | 9/2018 | Chuang et al. |
| 2019/0182498 A1* | 6/2019 | Yamamoto ............ H04N 19/157 |
| 2019/0246128 A1 | 8/2019 | Xu et al. |
| 2019/0246143 A1 | 8/2019 | Zhang et al. |
| 2019/0379914 A1 | 12/2019 | Misra et al. |
| 2021/0076034 A1 | 3/2021 | Misra et al. |
| 2021/0112248 A1* | 4/2021 | Zhang ................... H04N 19/186 |
| 2021/0112262 A1 | 4/2021 | Jang |
| 2021/0235079 A1 | 7/2021 | Chuang et al. |
| 2021/0289221 A1 | 9/2021 | Misra et al. |

FOREIGN PATENT DOCUMENTS

| CN | 1777283 A | 5/2006 |
| CN | 101394565 A | 3/2009 |
| CN | 103096066 A | 5/2013 |
| CN | 103237216 A | 8/2013 |
| CN | 103250416 A | 8/2013 |
| CN | 103444177 A | 12/2013 |
| CN | 104081777 A | 10/2014 |
| CN | 104202602 A | 12/2014 |
| CN | 105850131 A | 8/2016 |
| CN | 106375765 A | 2/2017 |
| CN | 106716999 A | 5/2017 |
| CN | 107079160 A | 8/2017 |
| CN | 107637081 A | 1/2018 |
| CN | 107925773 A | 4/2018 |
| CN | 108632608 A | 10/2018 |
| CN | 108668136 A | 10/2018 |
| CN | 108781289 A | 11/2018 |
| CN | 109151468 A | 1/2019 |
| CN | 109151477 A | 1/2019 |
| JP | 4921239 B2 | 4/2012 |
| JP | 2013077899 A | 4/2013 |
| JP | 2014535221 A | 12/2014 |
| JP | 2017523677 A | 8/2017 |
| KR | 20180026396 A | 3/2018 |
| RU | 2575409 C2 | 2/2016 |
| WO | 2004008775 A1 | 1/2004 |
| WO | 2016074147 A1 | 5/2016 |
| WO | 2017034331 A1 | 3/2017 |
| WO | 2017123980 A1 | 7/2017 |
| WO | 2017200925 A1 | 11/2017 |
| WO | 2017206803 A1 | 12/2017 |
| WO | 2017222331 A1 | 12/2017 |
| WO | 2018047952 A1 | 3/2018 |
| WO | 2018088805 A1 | 5/2018 |
| WO | 2020035022 A1 | 2/2020 |
| WO | 2020056452 A1 | 3/2020 |
| WO | 2020056757 A1 | 3/2020 |

OTHER PUBLICATIONS

Bross et al., "Versatile Video Coding (Draft 2)," Joint Video Experts Team (JVET) of ITU-T SG 16 WP 3 and ISO/IEC JTC 1/SC 29/WG 11, Document: JVET-K1001-v4, 11th Meeting: Ljubljana, SI, Total 84 pages (Jul. 10-18, 2018).

Ma et al.,"Description of Core Experiment 1 (CE 1): Partitioning," Joint Video Exploration Team (JVET) of ITU-T SG 16 WP 3 and ISO/IEC JTC 1/SC 29/WG 11,10th Meeting: San Diego, US, Document: JVET-J1021, total 30 pages (Apr. 10-20, 2018).

Kawamura et al.,"AHG7: Chroma coding structure/tools in HEVC fidelity range extension," Joint Collaborative Team on Video Coding (JCT-VC) of ITU-T SG 16 WP 3 and ISO/IEC JTC 1/SC 29/WG 11, 11th Meeting: Shanghai, CN, Document: JCTVC-K0192, total 4 pages (Oct. 10-19, 2012).

Rosewarne et al.,"CE1-related: Chroma block coding and size restriction," Joint Video Experts Team (JVET) of ITU-T SG 16 WP 3 and ISO/IEC JTC 1/SC 29/WG 11, 12th Meeting: Macao, CN, Document: JVET-L0129_r1, total 4 pages (Oct. 3-12, 2018).

Zhao et al.,"CE1-related: Constrained chroma block partitioning," Joint Video Experts Team (JVET) of ITU-T SG 16 WP 3 and ISO/IEC JTC 1/SC 29/WG 11,12th Meeting: Macao, CN, Document: JVET-L0372-v1, total 3 pages (Oct. 3-12, 2018).

Kim et al.,"Block Partitioning Structure in the HEVC Standard," IEEE Transactions on Circuits and Systems for Video Technology, vol. 22, No. 12, pp. 1697-1706, Institute of Electrical and Electronics Engineers, New York, New York (Dec. 2012).

An et al., "CE1-related: Flexible Luma and Chroma Block Partitioning Trees Separation," Joint Video Experts Team (JVET) of ITU-T SG 16 WP 3 and ISO/IEC JTC 1/SC 29/WG 11, 12th Meeting: Macao, CN, JVET-L0184, total 8 pages (Oct. 3-12, 2018).

Hisu et al., "Description of SDR video coding technology proposal by MediaTek," [online], Joint Video Experts Team (JVET) of ITU-T Sg 16 WP 3 and ISO/IEC JTC 1/SC 29/WG 11, 10th Meeting: San Diego, US, Document: JVETJ0018, Total 14 pages, Geneva, Switzerland (Apr. 10-20, 2018).

Edited by Tokumichi Murakami et al., "High Efficiency Video Coding Technology HEVC/H.265 and its application," First edition, Ohmsha, Ltd., Total 26 pages, ISBN: 978-4-274-21329-8 (document indicating well-known technique) (Feb. 25, 2013). With an English Abstract.

Shinichi Kuroda et al., "A study on motion vectors on chrominance," Proceedings of the 2002 Engineering Sciences Society Conference of IEICE, the Institute of Electronics, Information and Communication Engineers, Total 9 pages (document indicating well-known technique) {Aug. 20, 2002). With an English Machine Translation.

\* cited by examiner (a) 4:4:4 format     (b) 4:2:2 format     (c) 4:2:0 format

PICTURE PARTITIONING METHOD AND APPARATUS

CROSS-REFERENCE TO RELATED APPLICATIONS

This application is a continuation of U.S. application Ser. No. 17/734,829, filed on May 2, 2022, which is a continuation of U.S. application Ser. No. 17/187,184, filed on Feb. 26, 2021, now U.S. Pat. No. 11,323,708, which is a continuation of International Application No. PCT/CN2019/103094, filed on Aug. 28, 2019, which claims priorities to Chinese Patent Application No. 201810990466.9, filed on Aug. 28, 2018 and Chinese Patent Application No. 201811116761.8, filed on Sep. 25, 2018 and Chinese Patent Application No. 201910183731.7, filed on Mar. 11, 2019 and Chinese Patent Application No. 201910191131.5, filed on Mar. 13, 2019 and Chinese Patent Application No. 201910173454.1, filed on Mar. 7, 2019 and Chinese Patent Application No. 201910219440.9, filed on Mar. 21, 2019 and Chinese Patent Application No. 201910696741.0, filed on Jul. 30, 2019. All of the aforementioned patent applications are hereby incorporated by reference in their entireties.

TECHNICAL FIELD

This application relates to the field of video coding, and more accurately, to a picture partitioning method and apparatus.

BACKGROUND

As internet technologies rapidly develop and people's material and spiritual cultures are increasingly enriched, there are increasing demands on applications of videos, especially high-definition videos, on the internet. However, a high-definition video has a quite large amount of data. To transmit the high-definition video on the internet with a limited bandwidth, a problem that needs to be first resolved is encoding and decoding of the video. Video coding is used in a wide range of digital video applications, for example, broadcast digital television, video transmission over internet and mobile networks, real-time conversational applications such as video chat and video conferencing, DVDs and Blu-ray discs, video content acquisition and editing systems, and security applications of camcorders.

Each picture of a video sequence is usually partitioned into a set of non-overlapping blocks, and coding is usually performed at a block level. For example, a prediction block is generated through spatial (intra picture) prediction and/or temporal (inter picture) prediction. Correspondingly, a prediction mode may include an intra prediction mode (spatial prediction) and an inter prediction mode (temporal prediction). An intra prediction mode set may include 35 different intra prediction modes, for example, non-directional modes such as a DC (or average) mode and a planar mode, or directional modes defined in H.265; or may include 67 different intra prediction modes, for example, non-directional modes such as a DC (or average) mode and a planar mode, or directional modes defined in H.266 under development. The set of inter prediction modes depends on an available reference picture and another inter prediction parameter, for example, depending on whether the entire reference picture is used or only a portion of the reference picture is used.

An existing video is generally a color video, and includes a chroma component in addition to a luma component. Therefore, in addition to encoding and decoding the luma component, the chroma component also needs to be encoded and decoded. However, encoding and decoding efficiency is comparatively low in a conventional technology.

SUMMARY

Embodiments of this application (or this disclosure) provide a picture partitioning apparatus and method.

According to a first aspect, an illustrative example of the present invention relates to a picture partitioning method. The method is performed by a video stream decoding or encoding apparatus. The method includes: determining a split mode of a current node, where the current node includes a luma block and a chroma block; determining, based on the split mode of the current node and a size of the current node, that the chroma block of the current node is not further split; and when the chroma block of the current node is not further split, splitting the luma block of the current node based on the split mode of the current node.

According to the method in the first aspect, when the chroma block of the current node is not further split, only the luma block of the current node can be split, thereby improving encoding and decoding efficiency, reducing a maximum throughput of a codec, and facilitating implementation of the codec.

According to a second aspect, an illustrative example of the present invention relates to a video stream decoding apparatus, including a processor and a memory. The memory stores an instruction, and the instruction enables the processor to perform the method according to the first aspect.

According to a third aspect, an illustrative example of the present invention relates to a video stream encoding apparatus, including a processor and a memory. The memory stores an instruction, and the instruction enables the processor to perform the method according to the first aspect.

According to a fourth aspect, a computer-readable storage medium is proposed. The computer-readable storage medium stores an instruction; and when the instruction is executed, one or more processors are enabled to encode video data. The instruction enables the one or more processors to perform the method according to any possible embodiment of the first aspect.

According to a fifth aspect, an illustrative example of the present invention relates to a computer program including program code. When the program code is executed on a computer, the method according to any possible embodiment of the first aspect is performed.

Details of one or more embodiments are described in accompanying drawings and the following descriptions. Other features, objects, and advantages will be apparent from the description, drawings, and claims.

BRIEF DESCRIPTION OF DRAWINGS

To describe the technical solutions in the embodiments of this application or in the background more clearly, the following describes the accompanying drawings for describing the embodiments of this application or the background.

Figure 1A:
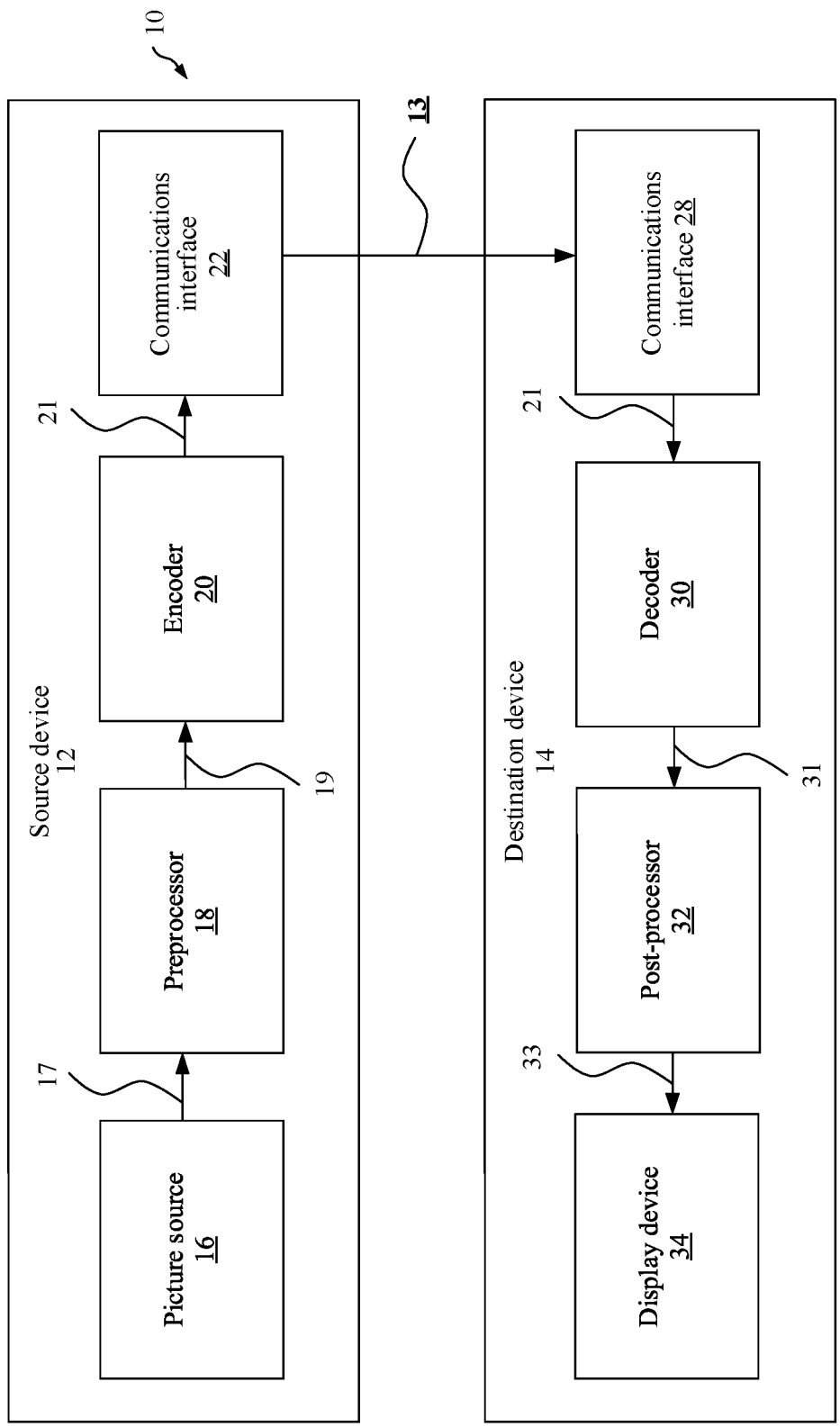
FIG. 1A is a block diagram of an example of a video coding system for implementing an illustrative example of the present invention.

In the following, identical reference signs represent identical or at least functionally equivalent features unless otherwise specified.

DESCRIPTION OF EMBODIMENTS

Video coding usually refers to the processing of a sequence of pictures, which form a video or video sequence. The terms "picture", "frame", and "image" may be used as synonyms in the field of video coding. Video coding used in this application (or present disclosure) indicates video encoding or video decoding. Video coding is performed on a source side, for example by processing (e.g., by compressing) raw video pictures to reduce an amount of data required for representing the video pictures, for more efficient storage and/or transmission. Video decoding is performed on a destination side, and usually includes inverse processing when compared to an encoder to reconstruct the video pictures. "Coding" of video pictures in the embodiments shall be understood as "encoding" or "decoding" of a video sequence. A combination of encoding components and decoding components is also referred to as codec (encoding and decoding).

Each picture of the video sequence is usually partitioned into a set of non-overlapping blocks, and coding is usually performed at a block level. In other words, on an encoder side, a video is usually processed, that is, encoded, at a block (which is also referred to as a picture block or a video block) level, for example, by using spatial (intra picture) prediction and/or temporal (inter picture) prediction to generate a prediction block, subtracting the prediction block from a current block (a block currently processed/to be processed) to obtain a residual block, transforming the residual block and quantizing the residual block in a transform domain to reduce an amount of data to be transmitted (compressed). On a decoder side, inverse processing compared to the encoder is applied to an encoded or compressed block to reconstruct a current block for representation. Furthermore, the encoder duplicates a decoder processing loop, so that the encoder and the decoder generate identical predictions (e.g., intra predictions and inter predictions) and/or reconstructions for processing, that is, coding subsequent blocks.

The term "block" may be a part of a picture or a frame. Key terms are defined as follows in this application:

A current block is a block that is being processed. For example, in encoding, the current block is a block that is currently being encoded; in decoding, the current block is a block that is being decoded. If the currently processed block is a chroma component block, the currently processed block is referred to as a current chroma block. A luma block corresponding to the current chroma block may be referred to as a current luma block.

CTU: is the abbreviation of coding tree unit. A picture includes a plurality of CTUs, and one CTU usually corresponds to one square picture region, and includes luma samples and chroma samples in the picture region (or may include only luma samples, or may include only chroma samples). The CTU further includes syntax elements. These syntax elements indicate a method about how to split the CTU into at least one coding unit (CU) and decode each coding unit to obtain a reconstructed picture.

CU: is the abbreviation of coding unit. A CU usually corresponds to an A×B rectangular region and includes A×B luma samples and chroma samples corresponding to the luma samples, where A is the width of the rectangle, B is the height of the rectangle, and A may be the same as or different from B. Values of A and B are usually integer powers of 2, for example, 256, 128, 64, 32, 16, 8, and 4. A coding unit may be decoded through decoding processing to obtain a reconstructed picture of an A×B rectangular region. The decoding processing usually includes performing processing such as prediction, dequantization, and inverse transformation, to generate a predicted picture and a residual. A reconstructed picture is obtained by superimposing the predicted picture and the residual.

The following describes embodiments of an encoder 20, a decoder 30, and a coding system 10 based on FIG. 1A to FIG. 3.

FIG. 1A is a conceptual or schematic block diagram illustrating an example of the coding system 10, for example, a video coding system 10 that may use technologies of this application (this disclosure). An encoder 20 (e.g., the video encoder 20) and a decoder 30 (e.g., the video decoder 30) of the video coding system 10 represent examples of devices that may be configured to perform intra prediction in accordance with various examples described in this application. As shown in FIG. 1A, the coding system 10 includes a source device 12, configured to provide encoded data 13, for example, an encoded picture 13, to a destination device 14 for decoding the encoded data 13.

The source device 12 includes an encoder 20, and may additionally or optionally include a picture source 16, a pre-processing unit 18, for example, a picture pre-processing unit 18, and a communications interface or communications unit 22.

The picture source 16 may include or be any type of picture capturing device, for example, for capturing a real-world picture, and/or any type of device for generating a picture or comment (for screen content encoding, some text on a screen is also considered as a part of a to-be-encoded picture or image), for example, a computer-graphics processor for generating a computer animated picture, or any type of other device for obtaining and/or providing a real-world picture, a computer animated picture (e.g., screen content, or a virtual reality (VR) picture) and/or any combination thereof (e.g., an augmented reality (AR) picture).

A picture can be considered as a two-dimensional array or matrix of samples with luma values. A sample in the array may also be referred to as a pixel (short form of picture element) or a pel. A quantity of samples in horizontal and vertical directions (or axes) of the array or the picture defines a size and/or resolution of the picture. For representation of color, three color components are usually employed, to be specific, the picture may be represented as or include three sample arrays. In RBG format or color space a picture includes a corresponding red, green and blue sample array. However, in video coding, each pixel is usually represented in a luma/chroma format or a color space. For example, YCbCr, which includes a luma component indicated by Y (sometimes L is used instead) and two chroma components indicated by Cb and Cr. The luminance (which is luma for short) component Y represents the brightness or gray level intensity (e.g., like in a gray-scale picture), while the two chrominance (which is chroma for short) components Cb and Cr represent the chromaticity or color information components. Accordingly, a picture in YCbCr format includes a luma sample array of luma sample values (Y), and two chroma sample arrays of chroma values (Cb and Cr). Pictures in RGB format may be converted or transformed into YCbCr format and vice versa, and the process is also known as color transformation or conversion. If a picture is monochrome, the picture may include only a luma sample array.

The picture source 16 (e.g., a video source 16) may be, for example, a camera for capturing a picture, a memory such as a picture memory, including or storing a previously captured or generated picture, and/or any kind of (internal or external) interface to obtain or receive a picture. The camera may be, for example, a local camera or an integrated camera integrated in the source device, and the memory may be a local memory or an integrated memory, for example, integrated in the source device. The interface may be, for example, an external interface for receiving a picture from an external video source. The external video source is, for example, an external picture capturing device such as a camera, an external memory, or an external picture generating device. The external picture generating device is, for example, an external computer-graphics processor, computer or server. The interface may be any type of interface, for example, a wired or wireless interface or an optical interface, according to any proprietary or standardized interface protocol. An interface for obtaining picture data 17 may be the same interface as the communications interface 22, or may be a part of the communications interface 22.

In distinction to the pre-processing unit 18 and processing performed by the pre-processing unit 18, the picture or picture data 17 (e.g., video data 16) may also be referred to as raw picture or raw picture data 17.

The pre-processing unit 18 is configured to: receive the (raw) picture data 17, and pre-process the picture data 17 to obtain a pre-processed picture 19 or pre-processed picture data 19. For example, pre-processing performed by the pre-processing unit 18 may include trimming, color format conversion (e.g., conversion from RGB to YCbCr), color tuning, and denoising. It may be understood that the pre-processing unit 18 may be an optional component.

The encoder 20 (e.g., the video encoder 20) is configured to receive the pre-processed picture data 19 and provide encoded picture data 21 (details are further described below, for example, based on FIG. 2 or FIG. 4). In an example, the encoder 20 may be configured to implement Embodiments 1 to 3.

The communications interface 22 of the source device 12 may be configured to: receive the encoded picture data 21, and transmit the encoded picture data 21 to another device, for example, the destination device 14 or any other device, for storage or direct reconstruction, or may be configured to process the encoded picture data 21 before correspondingly storing the encoded data 13 and/or transmitting the encoded data 13 to another device, where the another device is, for example, the destination device 14 or any other device for decoding or storage.

The destination device 14 includes a decoder 30 (e.g., a video decoder 30), and may additionally, i.e. optionally, include a communications interface or communications unit 28, a post-processing unit 32, and a display device 34.

The communications interface 28 of the destination device 14 is configured receive the encoded picture data 21 or the encoded data 13, for example, directly from the source device 12 or from any other source. The any other source is, for example, a storage device such as an encoded picture data storage device.

The communications interface 22 and the communications interface 28 may be configured to transmit or receive the encoded picture data 21 or the encoded data 13 over a direct communication link between the source device 12 and the destination device 14 or over any type of network. The direct communication link is, for example, a direct wired or wireless connection, and the any type of network is, for example, a wired or wireless network or any combination thereof, or any type of private and public networks, or any combination thereof.

The communications interface 22 may be, for example, configured to package the encoded picture data 21 into an appropriate format, for example, packets, for transmission over a communication link or communication network.

The communications interface 28, forming the counterpart of the communications interface 22, may be configured, for example, to de-package the encoded data 13 to obtain the encoded picture data 21.

Both the communications interface 22 and the communications interface 28 may be configured as unidirectional communications interfaces, as indicated by an arrow for the encoded data 13 from the source device 12 to the destination device 14 in FIG. 1A, or may be configured as a bidirectional communications interface, and may be configured, for example, to send and receive messages to establish a connection, and acknowledge and exchange any other information related to a communication link and/or data transmission such as encoded picture data transmission.

The decoder 30 is configured to receive the encoded picture data 21 and provide decoded picture data 31 or a decoded picture 31 (details are further described below, for example, based on FIG. 3 or FIG. 5). In an example, the decoder 30 may be configured to implement Embodiments 1 to 3.

A post-processor 32 of the destination device 14 is configured to post-process the decoded picture data 31 (which is also referred to as reconstructed picture data), for example, the decoded picture 131, to obtain post-processed picture data 33 such as a post-processed picture 33. Post-processing performed by the post-processing unit 32 may include, for example, color format conversion (e.g., conversion from YCbCr to RGB), color correction, trimming, or re-sampling, or any other processing, for example, for preparing the decoded picture data 31 for displaying by the display device 34.

The display device 34 of the destination device 14 is configured to receive the post-processed picture data 33, to display a picture to a user, a viewer, or the like. The display device 34 may be or include any type of display for presenting a reconstructed picture, for example, an integrated or external display or monitor. For example, the display may include a liquid crystal display (LCD), an organic light emitting diode (OLED) display, a plasma display, a projector, a micro LED display, a liquid crystal on silicon (LCoS), a digital light processor (DLP), or any type of other display.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

As will be apparent for a person skilled in the art based on the descriptions, (exact) division of functionalities of different units or functionalities of the source device 12 and/or the destination device 14 shown in FIG. 1A may vary depending on an actual device and application.

The encoder 20 (e.g., the video encoder 20) and the decoder 30 (e.g., the video decoder 30) may be implemented as any one of various proper circuits, for example, one or more microprocessors, a digital signal processor (DSP), an application-specific integrated circuit (ASIC), a field-programmable gate array (FPGA), discrete logic, hardware, or any combination thereof. If the technologies are implemented partially by using software, a device may store a software instruction in a proper non-transitory computer-readable storage medium and may execute the instruction by using hardware such as one or more processors, to perform the technologies of this disclosure. Any of the foregoing content (including hardware, software, a combination of hardware and software, and the like) may be considered as one or more processors. The video encoder 20 and the video decoder 30 each may be included in one or more encoders or decoders, and either the encoder or the decoder may be integrated into a part of a combined encoder/decoder (codec) in a corresponding apparatus.

The source device 12 may be referred to as a video encoding device or a video encoding apparatus. The destination device 14 may be referred to as a video decoding device or a video decoding apparatus. The source device 12 and the destination device 14 may be examples of a video encoding device or a video encoding apparatus.

The source device 12 and the destination device 14 may include any of a wide range of devices, including any type of handheld or stationary device, for example, a notebook or laptop computer, a mobile phone, a smartphone, a tablet or tablet computer, a camera, a desktop computer, a set-top box, a television, a display device, a digital media player, a video game console, a video streaming device (such as a content service server or a content delivery server), a broadcast receiver device, or a broadcast transmitter device, and may use or not use any type of operating system.

In some cases, the source device 12 and the destination device 14 may be equipped for wireless communication. Therefore, the source device 12 and the destination device 14 may be wireless communications devices.

In some cases, the video coding system 10 shown in FIG. 1A is merely an example, and the technologies of this application are applicable to video coding settings (e.g., video encoding or video decoding) that do not necessarily include any data communication between encoding and decoding devices. In another example, data may be retrieved from a local memory, streamed over a network, or the like. The video encoding device may encode data and store the data into a memory, and/or the video decoding device may retrieve the data from the memory and decode the data. In some examples, encoding and decoding are performed by devices that do not communicate with each other but simply encode data to a memory and/or retrieve the data from the memory and decode the data.

It should be understood that for each of the foregoing examples described with reference to the video encoder 20, the video decoder 30 may be configured to perform a reverse process. With respect to signaling syntax elements, the video decoder 30 can be configured to receive and parse these syntax elements and decode related video data accordingly. In some examples, the video encoder 20 may entropy encode the syntax elements into an encoded video bitstream. In these examples, the video decoder 30 may parse these syntax elements and decode associated video data accordingly.

Figure 1B:
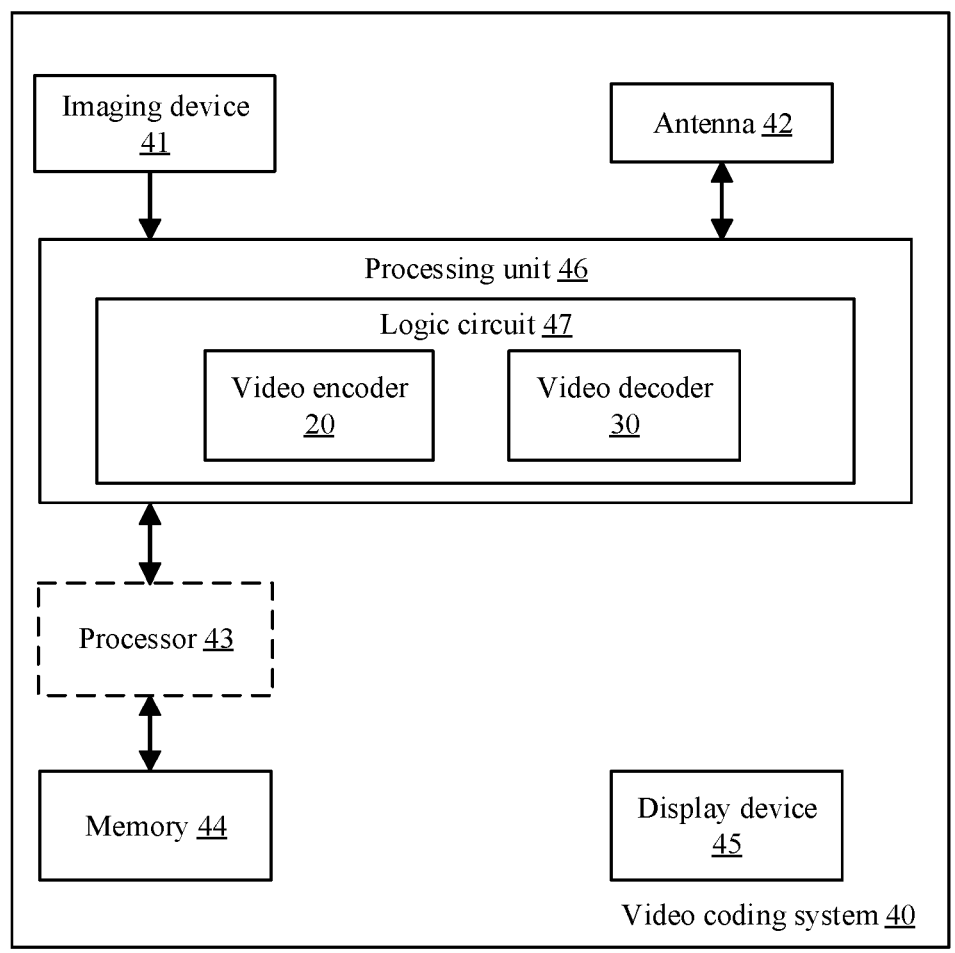
FIG. 1B is a block diagram of an example of a video coding system including either or two of an encoder 20 in FIG. 2 and a decoder 30 in FIG. 3.
Figure 2:
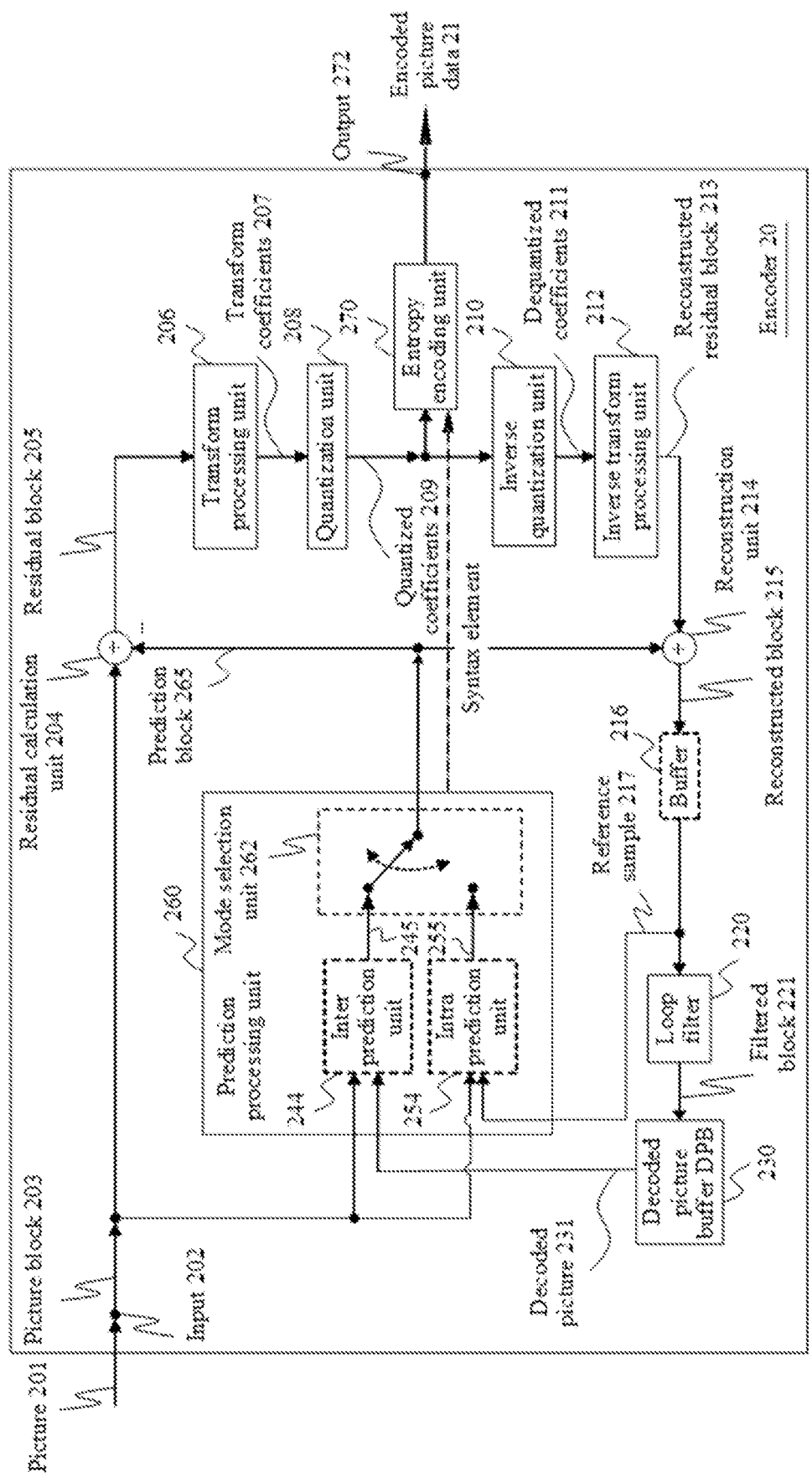
FIG. 2 is a block diagram showing an example structure of a video encoder for implementing an illustrative example of the present invention.
Figure 3:
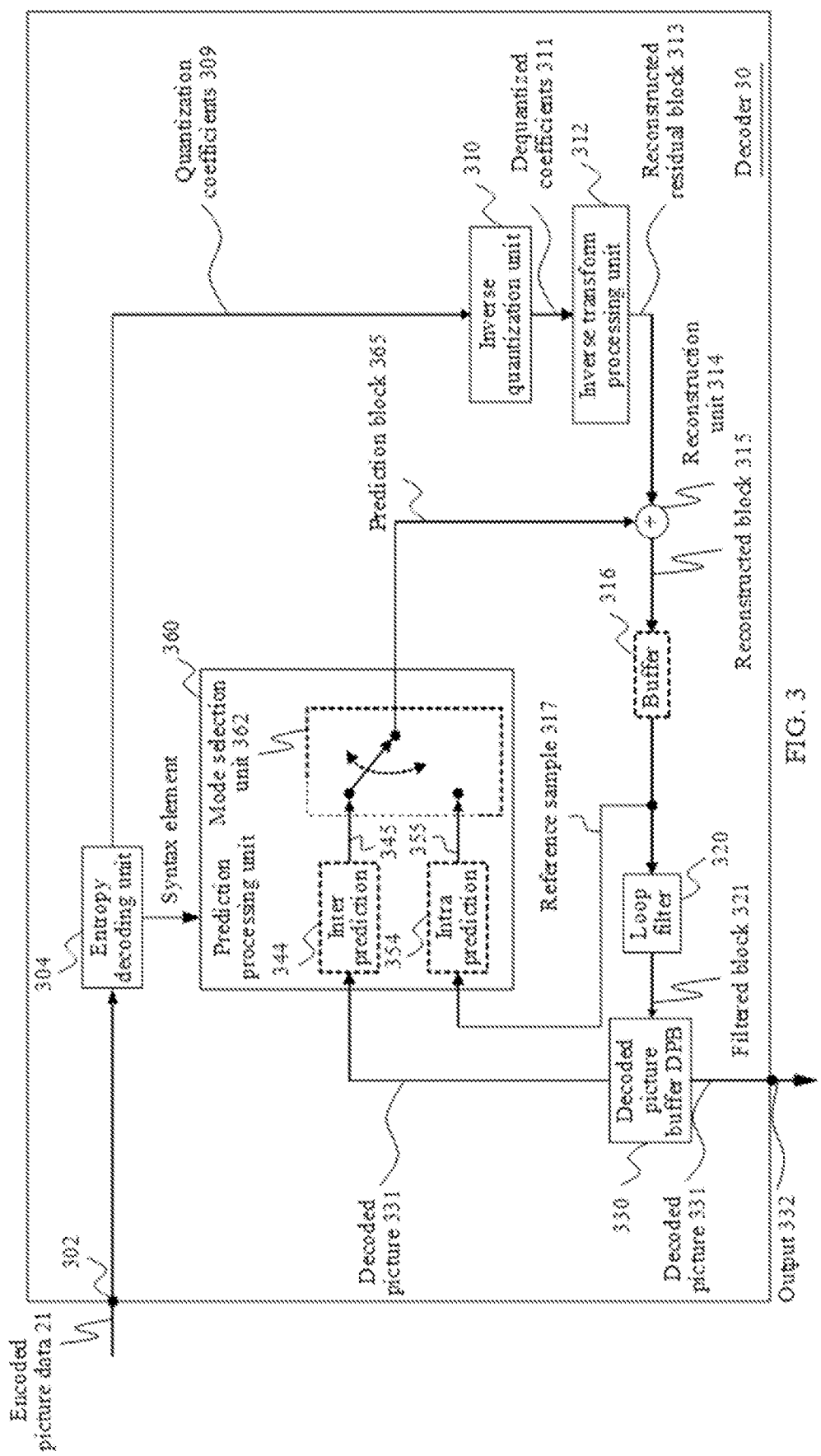
FIG. 3 is a block diagram showing an example structure of a video decoder for implementing an illustrative example of the present invention.

FIG. 1B is an illustrative diagram of an example of a video coding system 40 including an encoder 20 in FIG. 2 and/or a decoder 30 in FIG. 3 according to an example embodiment. The system 40 can implement a combination of various technologies of this application. In the illustrated implementation, the video coding system 40 may include an imaging device 41, the video encoder 20, the video decoder 30 (and/or a video encoder/decoder implemented by a logic circuit 47 of a processing unit 46), an antenna 42, one or more processors 43, one or more memories 44, and/or a display device 45.

As shown in the figure, the imaging device 41, the antenna 42, the processing unit 46, the logic circuit 47, the video encoder 20, the video decoder 30, the processor 43, the memory 44, and/or the display device 45 can communicate with each other. As described, although the video coding system 40 is illustrated by using the video encoder 20 and the video decoder 30, in another different example, the video coding system 40 may include only the video encoder 20 or only the video decoder 30.

In some examples, as shown in the figure, the video coding system 40 may include the antenna 42. For example, the antenna 42 may be configured to transmit or receive an encoded bitstream of video data. In addition, in some examples, the video coding system 40 may include the display device 45. The display device 45 may be configured to present the video data. In some examples, as shown in the figure, the logic circuit 47 may be implemented by the processing unit 46. The processing unit 46 may include application-specific integrated circuit (ASIC) logic, a graphics processor, a general-purpose processor, or the like. The video coding system 40 may also include the optional processor 43. The optional processor 43 may similarly include application-specific integrated circuit (ASIC) logic, a graphics processor, a general-purpose processor, or the like. In some examples, the logic circuit 47 may be implemented by hardware, for example, video coding dedicated hardware, and processor 43 may be implemented by general purpose software, an operating system, or the like. In addition, the memory 44 may be any type of memory, for example, a volatile memory (e.g., a static random access memory (SRAM) or a dynamic random access memory (DRAM)), or a nonvolatile memory (e.g., a flash memory). In a non-limitative example, the memory 44 may be implemented by a cache memory. In some examples, the logic circuit 47 may access the memory 44 (e.g., for implementation of a picture buffer). In other examples, the logic circuit 47 and/or the processing unit 46 may include a memory (e.g., a cache) for implementation of a picture buffer or the like.

In some examples, the video encoder 20 implemented by the logic circuit may include a picture buffer (which is, for example, implemented by the processing unit 46 or the memory 44) and a graphics processing unit (which is, for example, implemented by the processing unit 46). The graphics processing unit may be communicatively coupled to the picture buffer. The graphics processing unit may include the video encoder 20 implemented by the logic circuit 47, to implement various modules that are described with reference to FIG. 2 and/or any other encoder system or subsystem described in this specification. The logic circuit may be configured to perform various operations described in this specification.

The video decoder 30 may be implemented in a similar manner as implemented by the logic circuit 47 to embody the various modules as discussed with respect to a decoder 30 in FIG. 3 and/or any other decoder system or subsystem described in this specification. In some examples, the video decoder 30 implemented by the logic circuit may include a picture buffer (which is, for example, implemented by a processing unit 2820 or the memory 44) and a graphics processing unit (which is, for example, implemented by the processing unit 46). The graphics processing unit may be communicatively coupled to the picture buffer. The graphics processing unit may include the video decoder 30 implemented by the logic circuit 47, to implement various modules that are described with reference to FIG. 3 and/or any other decoder system or subsystem described in this specification.

In some examples, the antenna 42 of the video coding system 40 may be configured to receive an encoded bitstream of video data. As described, the encoded bitstream may include data, an indicator, an index value, mode selection data, or the like that is related to video frame encoding and that is described in this specification, for example, data related to coding partitioning (e.g., a transform coefficient or a quantized transform coefficient, an optional indicator (as described), and/or data defining coding partitioning). The video coding system 40 may further include the video decoder 30 that is coupled to the antenna 42 and that is configured to decode the encoded bitstream. The display device 45 is configured to present a video frame.

Encoder & Encoding Method

FIG. 2 is a schematic/conceptual block diagram of an example of a video encoder 20 configured to implement a technology (disclosed) in this application. In the example of FIG. 2, the video encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (which is not shown in the diagram). The video encoder 20 shown in FIG. 2 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, and the prediction processing unit 260 form a backward signal path of the encoder, where the backward signal path of the video encoder corresponds to a signal path of a decoder (refer to a decoder 30 in FIG. 3).

The encoder 20 receives, for example, via an input 202, a picture 201 or a block 203 of a picture 201, for example, a picture in a sequence of pictures forming a video or a video sequence. The picture block 203 may also be referred to as a current picture block or a to-be-encoded picture block, and the picture 201 may be referred to as a current picture or a to-be-encoded picture (particularly in video coding, to distinguish the current picture from other pictures, for example, previously encoded and/or decoded pictures in a same video sequence, namely, the video sequence which also includes the current picture).

Partitioning

In an embodiment, the encoder 20 may include a partitioning unit (which is not depicted in FIG. 2) configured to partition the picture 201 into a plurality of blocks such as blocks 203. The picture 201 is usually partitioned into a plurality of non-overlapping blocks. The partitioning unit may be configured to: use a same block size for all pictures of a video sequence and a corresponding grid defining the block size, or to change a block size between pictures or subsets or groups of pictures, and partition each picture into corresponding blocks.

In an example, the prediction processing unit 260 of the video encoder 20 may be configured to perform any combination of the foregoing partitioning technologies.

Like the picture 201, the block 203 is also or may be considered as a two-dimensional array or matrix of samples with luma values (sample values), although a size of the block 203 is less than a size of the picture 201. In other words, the block 203 may include, for example, one sample array (e.g., a luma array in a case of a monochrome picture 201), three sample arrays (e.g., one luma array and two chroma arrays in a case of a color picture), or any other quantity and/or type of arrays depending on an applied color format. A quantity of samples in horizontal and vertical directions (or axes) of the block 203 define a size of the block 203.

The encoder 20 shown in FIG. 2 is configured to encode the picture 201 block by block, for example, encoding and predicting each block 203.

Residual Calculation

The residual calculation unit 204 is configured to calculate a residual block 205 based on the picture block 203 and a prediction block 265 (details about the prediction block 265 are further provided below), for example, by subtracting sample values of the prediction block 265 from sample values of the picture block 203 sample by sample (pixel by pixel), to obtain the residual block 205 in a sample domain.

Transform

The transform processing unit 206 is configured to apply a transform, for example, a discrete cosine transform (DCT) or a discrete sine transform (DST), to sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as transforms specified in HEVC/H.265. Compared with an orthogonal DCT transform, such integer approximations are usually scaled by a specific factor. To preserve a norm of a residual block which is processed by using forward and inverse transforms, an additional scaling factor is applied as a part of the transform process. The scaling factor is usually chosen based on some constraints, for example, the scaling factor being a power of two for a shift operation, bit depth of the transform coefficients, and a tradeoff between accuracy and implementation costs. For example, a specific scaling factor is specified for the inverse transform by, for example, the inverse transform processing unit 212 on a side of the decoder 30 (and a corresponding inverse transform by, for example, the inverse transform processing unit 212 on a side of the encoder 20), and correspondingly, a corresponding scale factor may be specified for the forward transform by the transform processing unit 206 on a side of the encoder 20.

Quantization

The quantization unit 208 is configured to quantize the transform coefficients 207 to obtain quantized transform coefficients 209, for example, by applying scalar quantization or vector quantization. The quantized transform coefficients 209 may also be referred to as quantized residual coefficients 209. A quantization process can reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scaling may be applied to achieve finer or coarser quantization. A smaller quantization step size corresponds to finer quantization, and a larger quantization step size corresponds to coarser quantization. An appropriate quantization step size may be indicated by a quantization parameter (QP). For example, the quantization parameter may be an index to a predefined set of appropriate quantization step sizes. For example, a smaller quantization parameter may correspond to finer quantization (a smaller quantization step size), and a larger quantization parameter may correspond to coarser quantization (a larger quantization step size), or vice versa. The quantization may include division by a quantization step size and corresponding quantization or inverse quantization, for example, performed by the inverse quantization unit 210, or may include multiplication by a quantization step size. Embodiments according to some standards such as HEVC may use a quantization parameter to determine the quantization step size. Generally, the quantization step size may be calculated based on a quantization parameter by using a fixed point approximation of an equation including division. Additional scaling factors may be introduced for quantization and dequantization to restore the norm of the residual block, which may get modified because of scaling used in the fixed point approximation of the equation for the quantization step size and the quantization parameter. In one example implementation, scaling of the inverse transform and dequantization may be combined. Alternatively, customized quantization tables may be used and signaled from an encoder to a decoder, for example, in a bitstream. The quantization is a lossy operation, where the loss increases with increasing quantization step sizes.

The inverse quantization unit 210 is configured to apply inverse quantization of the quantization unit 208 on quantized coefficients to obtain dequantized coefficients 211, for example, apply, based on or by using a same quantization step size as the quantization unit 208, the inverse of a quantization scheme applied by the quantization unit 208. The dequantized coefficients 211 may also be referred to as dequantized residual coefficients 211 and correspond to the transform coefficients 207, although usually not identical to the transform coefficients due to the loss caused by quantization.

The inverse transform processing unit 212 is configured to apply an inverse transform of the transform applied by the transform processing unit 206, for example, an inverse discrete cosine transform (DCT) or an inverse discrete sine transform (DST), to obtain an inverse transform block 213 in the sample domain. The inverse transform block 213 may also be referred to as an inverse transform dequantized block 213 or an inverse transform residual block 213.

The reconstruction unit 214 (e.g., a summer 214) is configured to add the inverse transform block 213 (that is, the reconstructed residual block 213) to the prediction block 265, for example, by adding sample values of the reconstructed residual block 213 and the sample values of the prediction block 265, to obtain a reconstructed block 215 in the sample domain.

Optionally, a buffer unit 216 (or "buffer" 216 for short) of, for example, the line buffer 216, is configured to buffer or store the reconstructed block 215 and a corresponding sample value, for example, for intra prediction. In other embodiments, the encoder may be configured to use an unfiltered reconstructed block and/or a corresponding sample value stored in the buffer unit 216 for any type of estimation and/or prediction, for example, intra prediction.

For example, in an embodiment, the encoder 20 may be configured so that the buffer unit 216 is not only used for storing the reconstructed block 215 for intra prediction 254 but also used for the loop filter unit 220 (which is not shown in FIG. 2), and/or so that, for example, the buffer unit 216 and the decoded picture buffer unit 230 form one buffer. In other embodiments, filtered blocks 221 and/or blocks or samples from the decoded picture buffer 230 (the blocks or samples are not shown in FIG. 2) are used as an input or a basis for intra prediction 254.

The loop filter unit 220 (or "loop filter" 220 for short) is configured to filter the reconstructed block 215 to obtain a filtered block 221, to smooth pixel transitions or improve video quality. The loop filter unit 220 is intended to represent one or more loop filters such as a deblocking filter, a sample-adaptive offset (SAO) filter, or another filter such as a bilateral filter, an adaptive loop filter (ALF), a sharpening or smoothing filter, or a collaborative filter. Although the loop filter unit 220 is shown as an in-loop filter in FIG. 2, in another configuration, the loop filter unit 220 may be implemented as a post-loop filter. The filtered block 221 may also be referred to as a filtered reconstructed block 221. The decoded picture buffer 230 may store the reconstructed encoded blocks after the loop filter unit 220 performs filtering operations on the reconstructed encoded blocks.

In an embodiment, the encoder 20 (correspondingly, the loop filter unit 220) may be configured to output loop filter parameters (such as sample adaptive offset information), for example, directly or after entropy encoding performed by the entropy encoding unit 270 or any other entropy encoding unit, so that, for example, the decoder 30 can receive the same loop filter parameters and apply the same loop filter parameters for decoding.

The decoded picture buffer (DPB) 230 may be a reference picture memory that stores reference picture data for use in video data encoding by the video encoder 20. The DPB 230 may be formed by any one of a variety of memory devices such as a dynamic random access memory (DRAM) (including a synchronous DRAM (SDRAM), a magnetoresistive RAM (MRAM), a resistive RAM (RRAM)), or other types of memory devices. The DPB 230 and the buffer 216 may be provided by a same memory device or separate memory devices. In an example, the decoded picture buffer (DPB) 230 is configured to store the filtered block 221. The decoded picture buffer 230 may be further configured to store other previously filtered blocks, for example, previously reconstructed and filtered blocks 221, of the same current picture or of different pictures, for example, previously reconstructed pictures, and may provide complete previously reconstructed, that is, decoded pictures (and corresponding reference blocks and samples) and/or a partially reconstructed current picture (and corresponding reference blocks and samples), for example, for inter prediction. In an example, if the reconstructed block 215 is reconstructed without in-loop filtering, the decoded picture buffer (DPB) 230 is configured to store the reconstructed block 215.

The prediction processing unit 260, also referred to as a block prediction processing unit 260, is configured to receive or obtain the picture block 203 (a current block 203 of the current picture 201) and reconstructed picture data, for example, reference samples of the same (current) picture from the buffer 216 and/or reference picture data 231 of one or more previously decoded pictures from the decoded picture buffer 230, and process such data for prediction, to be specific, to provide the prediction block 265 that may be an inter prediction block 245 or an intra prediction block 255.

The mode selection unit 262 may be configured to select a prediction mode (e.g., an intra or inter prediction mode) and/or a corresponding prediction block 245 or 255 to be used as the prediction block 265, for calculation of the residual block 205 and for reconstruction of the reconstructed block 215.

In an embodiment, the mode selection unit 262 may be configured to select the prediction mode (e.g., from prediction modes supported by the prediction processing unit 260). The prediction mode provides a best match or in other words a minimum residual (the minimum residual means better compression for transmission or storage), or provides minimum signaling overheads (the minimum signaling overheads mean better compression for transmission or storage), or considers or balances both. The mode selection unit 262 may be configured to determine the prediction mode based on rate-distortion optimization (RDO), that is, select a prediction mode that provides minimum rate-distortion optimization or select a prediction mode for which related rate distortion at least satisfies a prediction mode selection criterion.

In the following, prediction processing performed (e.g., by using the prediction processing unit 260) and mode selection performed (e.g., by using the mode selection unit 262) by an example of the encoder 20 are described in more detail.

As described above, the encoder 20 is configured to determine or select a best prediction mode or an optimal prediction mode from a set of (pre-determined) prediction modes. The set of prediction modes may include, for example, intra prediction modes and/or inter prediction modes.

The intra prediction mode set may include 35 different intra prediction modes, or may include 67 different intra prediction modes, or may include an intra prediction mode defined in H.266 that is being developed.

The set of inter prediction modes depends on an available reference picture (that is, at least a part of the decoded picture stored in the DBP 230) and another inter prediction parameter, for example, depending on whether the entire reference picture is used or only a part of the reference picture is used, for example, a search window region around a region of the current block, to search for a best matching reference block, and/or depending, for example, on whether pixel interpolation such as half-pixel and/or quarter-pixel interpolation is applied.

Additional to the above prediction modes, a skip mode and/or a direct mode may be applied.

The prediction processing unit 260 may be further configured to split the block 203 into smaller block partitions or sub-blocks, for example, by iteratively using quadtree (QT) partitioning, binary-tree (BT) partitioning, ternary-tree (TT) partitioning, or any combination thereof, and to perform, for example, prediction for each of the block partitions or sub-blocks. Mode selection includes selection of a tree structure of the partitioned block 203 and selection of a prediction mode applied to each of the block partitions or sub-blocks.

The inter prediction unit 244 may include a motion estimation (ME) unit (which is not shown in FIG. 2) and a motion compensation (MC) unit (which is not shown in FIG. 2). The motion estimation unit is configured to receive or obtain the picture block 203 (the current picture block 203 of the current picture 201) and a decoded picture 231, or at least one or more previously reconstructed blocks, for example, one or more reconstructed blocks of other/different previously decoded pictures 231, for motion estimation. For example, a video sequence may include the current picture and the previously decoded pictures 31. In other words, the current picture and the previously decoded pictures 31 may be a part of or form a sequence of pictures forming the video sequence.

For example, the encoder 20 may be configured to select a reference block from a plurality of reference blocks of a same picture or different pictures of a plurality of other pictures and provide, to the motion estimation unit (which is not shown in FIG. 2), a reference picture and/or an offset (a spatial offset) between a position (coordinates X and Y) of the reference block and a position of the current block as an inter prediction parameter. This offset is also referred to as a motion vector (MV).

The motion compensation unit is configured to obtain, for example, receive, the inter prediction parameters and to perform inter prediction based on or by using the inter prediction parameters to obtain an inter prediction block 245. Motion compensation performed by the motion compensation unit (which is not shown in FIG. 2) may include fetching or generating the prediction block based on a motion/block vector determined through motion estimation (possibly by performing interpolations in sub-pixel precision). Interpolation filtering may generate additional pixel samples from known pixel samples, thereby potentially increasing a quantity of candidate prediction blocks that may be used to code a picture block. Upon receiving a motion vector for a PU of the current picture block, the motion compensation unit 246 may locate a prediction block to which the motion vector points in one of the reference picture lists. The motion compensation unit 246 may also generate syntax elements associated with the blocks and video slices for use by video decoder 30 in decoding the picture blocks of the video slice.

The intra prediction unit 254 is configured to obtain, for example, receive, a picture block 203 (the current picture block) and one or more previously reconstructed blocks, for example, reconstructed neighboring blocks, of a same picture for intra estimation. The encoder 20 may be, for example, configured to select an intra prediction mode from a plurality of (predetermined) intra prediction modes.

In an embodiment, the encoder 20 may be configured to select an intra prediction mode based on an optimization criterion, for example, based on a minimum residual (e.g., an intra prediction mode providing the prediction block 255 that is most similar to the current picture block 203) or minimum rate distortion.

The intra prediction unit 254 is further configured to determine the intra prediction block 255 based on, for example, intra prediction parameters in the selected intra prediction mode. In any case, after selecting an intra prediction mode of a block, the intra prediction unit 254 is further configured to provide intra prediction parameters, that is, information indicating the selected intra prediction mode of the block, to the entropy encoding unit 270. In an example, the intra prediction unit 254 may be configured to perform any combination of intra prediction technologies described below.

The entropy encoding unit 270 is configured to apply (or not apply) an entropy encoding algorithm or scheme (e.g., a variable-length coding (VLC) scheme, a context adaptive VLC (CAVLC) scheme, an arithmetic coding scheme, context adaptive binary arithmetic coding (CABAC), syntax-based context-adaptive binary arithmetic coding (SBAC), probability interval partitioning entropy (PIPE) coding, or another entropy encoding methodology or technology) to one or all of the quantized residual coefficients 209, the inter prediction parameters, the intra prediction parameters, and/or the loop filter parameters, to obtain encoded picture data 21 that may be output via an output 272, for example, in a form of an encoded bitstream 21. The encoded bitstream may be transmitted to the video decoder 30, or archived for later transmission or retrieval by the video decoder 30. The entropy encoding unit 270 may be further configured to entropy encode other syntax elements for a current video slice being encoded.

Other structural variations of the video encoder 20 can be used to encode a video stream. For example, a non-transform based encoder 20 may quantize a residual signal directly without the transform processing unit 206 for some blocks or frames. In another implementation, the encoder 20 may have the quantization unit 208 and the inverse quantization unit 210 combined into a single unit.

FIG. 3 shows an example of a video decoder 30, configured to implement a technology of this application. The video decoder 30 is configured to receive encoded picture data (e.g., an encoded bitstream) 21 encoded by, for example, an encoder 20, to obtain a decoded picture 231. In a decoding process, the video decoder 30 receives video data from the video encoder 20, for example, an encoded video bitstream that represents a picture block of an encoded video slice and associated syntax elements.

In the example of FIG. 3, the decoder 30 includes an entropy decoding unit 304, an inverse quantization unit 310, an inverse transform processing unit 312, a reconstruction unit 314 (e.g., a summer 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some examples, the video decoder 30 may perform a decoding pass generally reciprocal to the encoding pass described with reference to the video encoder 20 in FIG. 2.

The entropy decoding unit 304 is configured to perform entropy decoding on the encoded picture data 21 to obtain, for example, quantized coefficients 309 and/or decoded coding parameters (which are not shown in FIG. 3), for example, any one or all of an inter prediction parameters, intra prediction parameters, loop filter parameters, and/or other syntax elements (that are decoded). The entropy decoding unit 304 is further configured to forward the inter prediction parameters, the intra prediction parameters, and/or the other syntax elements to the prediction processing unit 360. The video decoder 30 may receive syntax elements at a video slice level and/or a video block level.

The inverse quantization unit 310 may have a same function as the inverse quantization unit 110, the inverse transform processing unit 312 may have a same function as the inverse transform processing unit 212, the reconstruction unit 314 may have a same function as the reconstruction unit 214, the buffer 316 may have a same function as the buffer 216, the loop filter 320 may have a same function as the loop filter 220, and the decoded picture buffer 330 may have a same function as the decoded picture buffer 230.

The prediction processing unit 360 may include the inter prediction unit 344 and the intra prediction unit 354. The inter prediction unit 344 may be similar to the inter prediction unit 244 in function, and the intra prediction unit 354 may be similar to the intra prediction unit 254 in function. The prediction processing unit 360 is usually configured to perform block prediction and/or obtain a prediction block 365 from the encoded data 21, and receive or obtain (explicitly or implicitly) prediction-related parameters and/or information about a selected prediction mode, for example, from the entropy decoding unit 304.

When the video slice is coded as an intra coded (I) slice, the intra prediction unit 354 of the prediction processing unit 360 is configured to generate the prediction block 365 for a picture block of the current video slice based on a signaled intra prediction mode and data that is from previously decoded blocks of a current frame or picture. When the video frame is coded as an inter coded (that is, B or P) slice, the inter prediction unit 344 (e.g., a motion compensation unit) of the prediction processing unit 360 is configured to generate a prediction blocks 365 for a video block of the current video slice based on a motion vector and the other syntax elements received from the entropy decoding unit 304. For inter prediction, the prediction block may be generated from one of the reference pictures in one of the reference picture lists. The video decoder 30 may construct reference frame lists, a list 0 and a list 1, by using default construction technologies based on reference pictures stored in the DPB 330.

The prediction processing unit 360 is configured to determine prediction information for a video block of the current video slice by parsing the motion vector and the other syntax elements, and use the prediction information to generate the prediction block for the current video block being decoded. For example, the prediction processing unit 360 uses some of the received syntax elements to determine a prediction mode (e.g., intra or inter prediction) used to code the video blocks of the video slice, an inter prediction slice type (e.g., a B slice, a P slice, or a GPB slice), construction information for one or more of the reference picture lists for the slice, motion vectors for each inter encoded video block of the slice, an inter prediction status for each inter coded video block of the slice, and other information to decode the video blocks in the current video slice.

The inverse quantization unit 310 may be configured to inverse quantize (that is, de-quantize) quantized transform coefficients provided in the bitstream and decoded by the entropy decoding unit 304. An inverse quantization process may include: using quantization parameters calculated by the video encoder 20 for each video block in the video slice, to determine a quantization degree that should be applied and, likewise, an inverse quantization degree that should be applied.

The inverse transform processing unit 312 is configured to apply an inverse transform (e.g., an inverse DCT, an inverse integer transform, or a conceptually similar inverse transform process) to transform coefficients, to generate a residual block in a pixel domain.

The reconstruction unit 314 (e.g., the summer 314) is configured to add an inverse transform block 313 (namely, a reconstructed residual block 313) to the prediction block 365, for example, by adding sample values of the reconstructed residual block 313 and sample values of the prediction block 365, to obtain a reconstructed block 315 in a sample domain.

The loop filter unit 320 (in a coding loop or after a coding loop) is configured to filter the reconstructed block 315 to obtain a filtered block 321, to smooth pixel transitions or improve video quality. In an example, the loop filter unit 320 may be configured to perform any combination of filtering technologies described below. The loop filter unit 320 is intended to represent one or more loop filters such as a deblocking filter, a sample-adaptive offset (SAO) filter, or another filter such as a bilateral filter, an adaptive loop filter (ALF), a sharpening or smoothing filter, or a collaborative filter. Although the loop filter unit 320 is shown as an in-loop filter in FIG. 3, in another configuration, the loop filter unit 320 may be implemented as a post-loop filter.

The decoded video blocks 321 in a given frame or picture are then stored in the decoded picture buffer 330 that stores reference pictures used for subsequent motion compensation.

The decoder 30 is configured to, for example, output the decoded picture 31 via an output 332, for presentation to a user or viewing by a user.

Other variations of the video decoder 30 may be configured to decode a compressed bitstream. For example, the decoder 30 may generate an output video stream without the loop filter unit 320. For example, a non-transform based decoder 30 may inversely quantize a residual signal directly without the inverse transform processing unit 312 for some blocks or frames. In another implementation, the video decoder 30 may have the inverse quantization unit 310 and the inverse transform processing unit 312 combined into a single unit.

Figure 4:
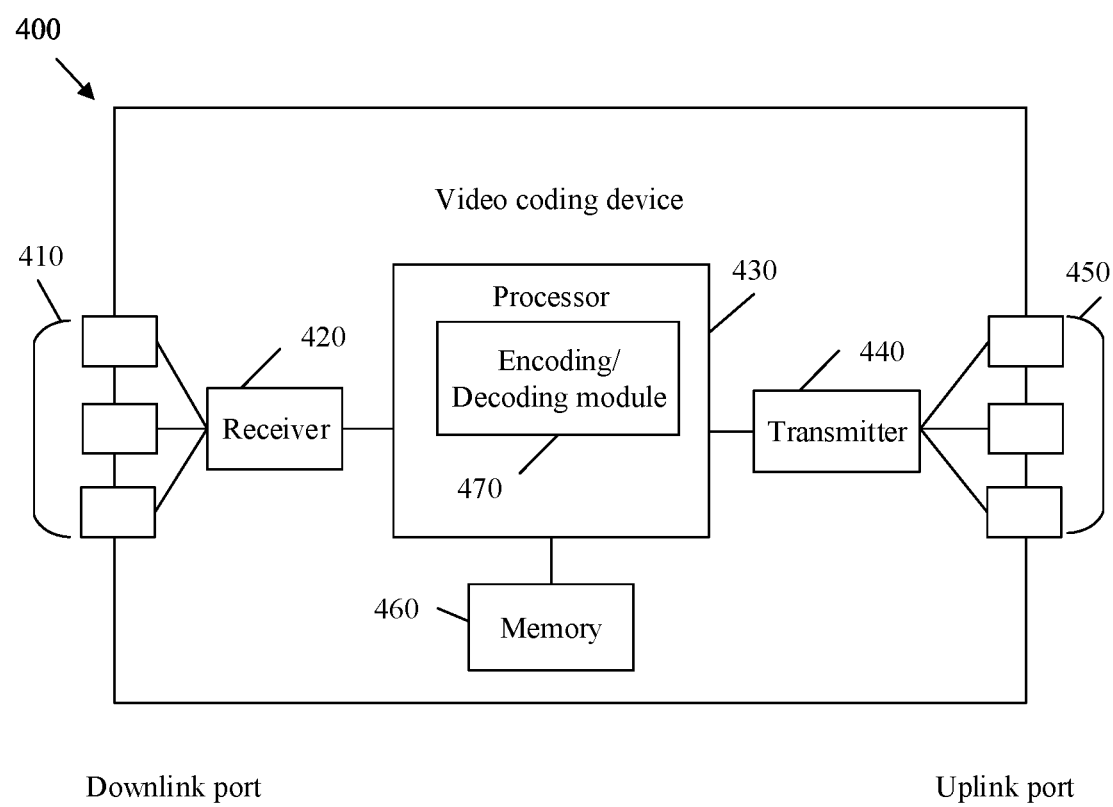
FIG. 4 is a block diagram illustrating an example of an encoding apparatus or a decoding apparatus.

FIG. 4 is a schematic structural diagram of a video coding device 400 (e.g., a video encoding device 400 or a video decoding device 400) according to an embodiment of the present invention. The video coding device 400 is suitable for implementing the embodiments described in this specification. In an embodiment, the video coding device 400 may be a video decoder (e.g., the video decoder 30 in FIG. 1A) or a video encoder (e.g., the video encoder 20 in FIG. 1A).). In another embodiment, the video coding device 400 may be one or more components in the video decoder 30 in FIG. 1A or the video encoder 20 in FIG. 1A.

The video coding device 400 includes ingress ports 410 and a receiver unit (Rx) 420 that are for receiving data; a processor, a logic unit, or a central processing unit (CPU) 430 for processing the data; a transmitter unit (Tx) 440 and egress ports 450 that are for transmitting the data; and a memory 460 for storing the data. The video coding device 400 may also include optical-to-electrical components and electrical-to-optical (EO) components that are coupled to the ingress ports 410, the receiver unit 420, the transmitter unit 440, and the egress ports 450, for egress or ingress of optical or electrical signals.

The processor 430 is implemented by hardware and software. The processor 430 may be implemented as one or more CPU chips, cores (e.g., a multi-core processor), FPGAs, ASICs, and DSPs. The processor 430 communicates with the ingress ports 410, the receiver unit 420, the transmitter unit 440, the egress ports 450, and the memory 460. The processor 430 includes a coding module 470 (e.g., an encoding module 470 or a decoding module 470). The encoding/decoding module 470 implements the foregoing disclosed embodiments. For example, the encoding/decoding module 470 performs, processes, or provides various coding operations. Therefore, the encoding/decoding module 470 provides a substantial improvement to the functionality of the video coding device 400 and affects transform of the video coding device 400 to a different state. Alternatively, the encoding/decoding module 470 is implemented as instructions stored in the memory 460 and executed by the processor 430.

The memory 460 includes one or more disks, tape drives, and solid-state drives and may be used as an over-flow data storage device, to store programs when these programs are selected for execution, and to store instructions and data that are read during program execution. The memory 460 may be volatile and/or nonvolatile, and may be a read-only memory (ROM), a random access memory (RAM), a ternary content-addressable memory (TCAM), and/or a static random access memory (SRAM).

Figure 5:
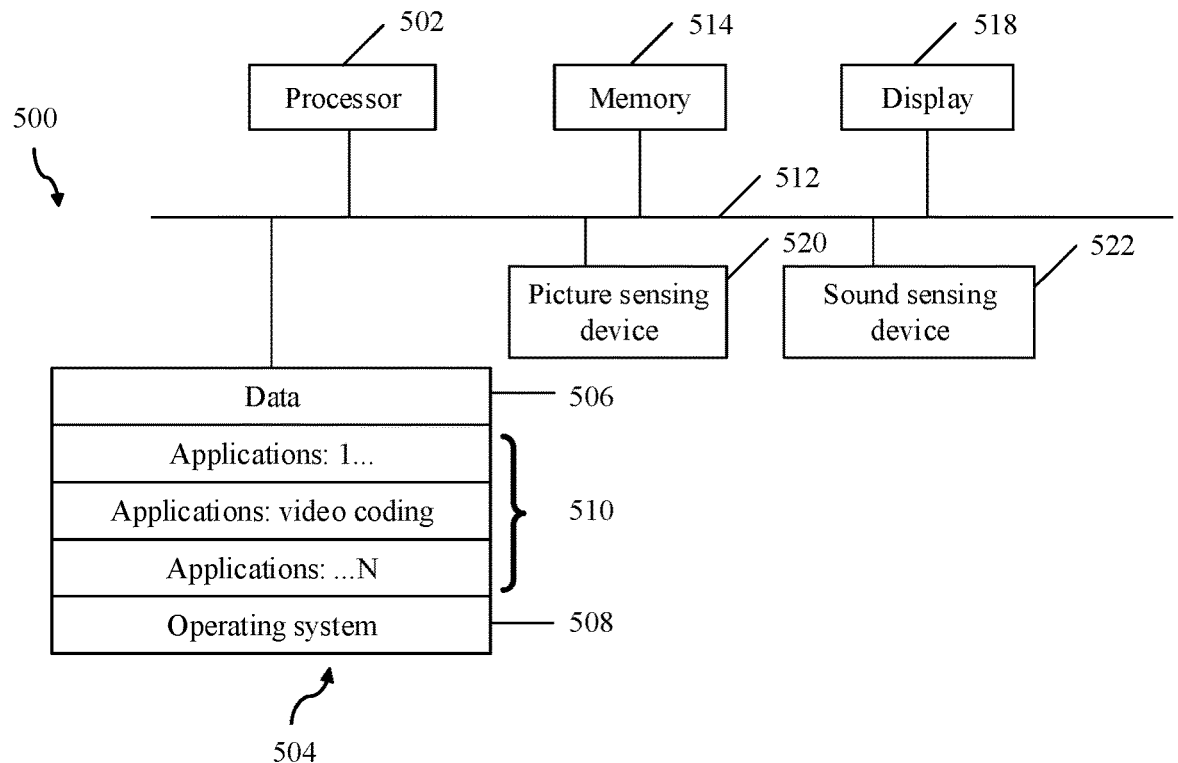
FIG. 5 is a block diagram illustrating an example of another encoding apparatus or another decoding apparatus.

FIG. 5 is a simplified block diagram of an apparatus 500 that may be used as either or two of the source device 12 and the destination device 14 in FIG. 1A according to an example embodiment. The apparatus 500 may implement the technology of this application. The apparatus 500 for implementing picture partitioning may be in a form of a computing system including a plurality of computing devices, or in a form of a single computing device such as a mobile phone, a tablet computer, a laptop computer, or a desktop computer.

A processor 502 of the apparatus 500 may be a central processing unit. Alternatively, a processor 502 may be any other type of device or a plurality of devices that can control or process information and that are existing or to be developed in the future. As shown in the figure, although the disclosed implementations can be practiced with a single processor such as the processor 502, advantages in speed and efficiency can be achieved by using more than one processor.

In an implementation, a memory 504 of the apparatus 500 can be a read only memory (ROM) device or a random access memory (RAM) device. Any other appropriate type of storage device can be used as the memory 504. The memory 504 can include code and data 506 that is accessed by the processor 502 by using a bus 512. The memory 504 can further include an operating system 508 and application programs 510. The application programs 510 include at least one program that allows the processor 502 to perform the methods described in this specification. For example, the application programs 510 may include applications 1 to N, and the applications 1 to N further include a video coding application that performs the method described in this specification. The apparatus 500 may also include an additional memory in a form of a secondary storage 514. The secondary storage 514 may be, for example, a memory card used with a mobile computing device. Because the video communication sessions may contain a large amount of information, these information can be stored in whole or in part in the secondary storage 514 and loaded into the memory 504 as needed for processing.

The apparatus 500 can also include one or more output devices, such as a display 518. In an example, the display 518 may be a touch sensitive display that combines a display with a touch sensitive element that is operable to sense touch inputs. The display 518 can be coupled to the processor 502 by using the bus 512. Other output devices that allow a user to program or otherwise use the apparatus 500 can be provided in addition to or as an alternative to the display 518. When the output device is or includes a display, the display can be implemented in different ways, including by a liquid crystal display (LCD), a cathode-ray tube (CRT) display, a plasma display or light emitting diode (LED) display, such as an organic LED (OLED) display.

The apparatus 500 may also include or be connected to a picture sensing device 520. The picture sensing device 520 is, for example, a camera or any other picture sensing device 520 that can sense a picture and that is existing or to be developed in the future. The picture is, for example, a picture of a user who runs the apparatus 500. The picture sensing device 520 may be placed directly facing a user who runs the apparatus 500. In an example, a position and an optical axis of the picture sensing device 520 may be configured so that a field of view of the picture sensing device 520 includes a region closely adjacent to the display 518 and the display 518 can be seen from the region.

The apparatus 500 may also include or be in communication with a sound sensing device 522, for example, a microphone or any other sound sensing device that is existing or to be developed in the future and that can sense sounds near the apparatus 500. The sound sensing device 522 may be placed directly facing a user who runs the apparatus 500, and may be configured to receive a sound, for example, a voice or another sound, made by the user when running the apparatus 500.

Although FIG. 5 depicts the processor 502 and the memory 504 of the apparatus 500 as being integrated into a single unit, other configurations may be utilized. Running of the processor 502 may be distributed in a plurality of machines (each machine includes one or more processors) that can be directly coupled, or distributed in a local region or another network. The memory 504 can be distributed across a plurality of machines such as a network-based memory or a memory in a plurality of machines on which the apparatus 500 is run. Although depicted herein as a single bus, the bus 512 of the apparatus 500 can include a plurality of buses. Further, the secondary storage 514 can be directly coupled to the other components of the apparatus 500 or can be accessed over a network and can include a single integrated unit such as a memory card or a plurality of units such as a plurality of memory cards. The apparatus 500 can thus be implemented in a wide variety of configurations.

Figure 6:
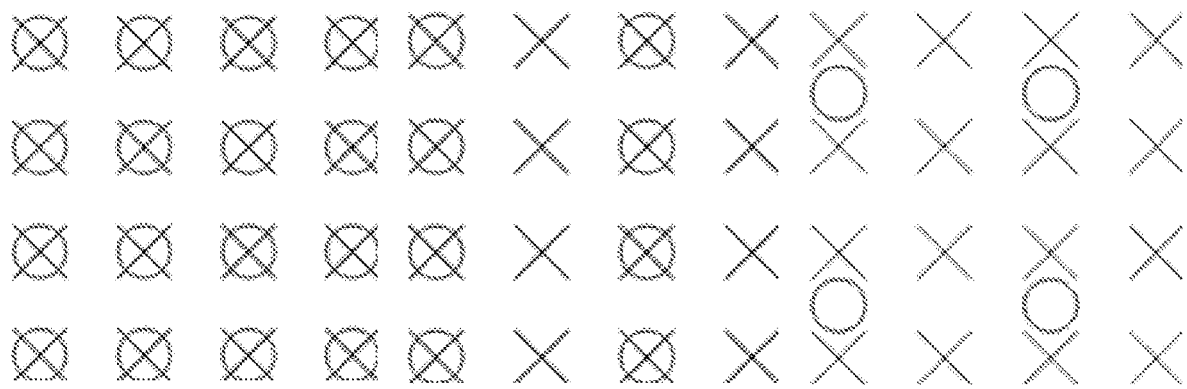
FIG. 6 shows an example of a sample grid in a YUV format.

As described above in this application, in addition to including a luma (Y) component, a color video further includes chroma components (U, V). Therefore, in addition to encoding on the luma component, the chroma components also need to be encoded. According to different methods for sampling the luma component and the chroma components in the color video, there are usually YUV4:4:4, YUV4:2:2, and YUV4:2:0. As shown in FIG. 6, a cross represents a sample of a luma component, and a circle represents a sample of a chroma component.

A 4:4:4 format indicates that the chroma component is not downsampled.

A 4:2:2 format indicates that, relative to the luma component, 2:1 horizontal downsampling is performed on a chroma component, and no vertical downsampling is performed on the chroma component. For every two U samples or V samples, each row includes four Y samples.

A 4:2:0 format indicates that, relative to the luma component, 2:1 horizontal downsampling is performed on a chroma component, and 2:1 vertical downsampling is performed on the chroma component.

The video decoder may be configured to split a video block according to three different split structures (QT, BT, and TT) by using five different split types allowed at each depth. The split types include a quadtree split (QT split structure), a horizontal binary tree split (BT split structure), a vertical binary tree split (BT split structure), and a horizontal center-side ternary tree split (TT split structure), and a vertical center-side ternary tree split (TT split structure), as shown in FIG. 7A to FIG. 7E.

The five split types are defined as follows: It should be noted that a square is considered as a special case of a rectangle.

Figure 7A:
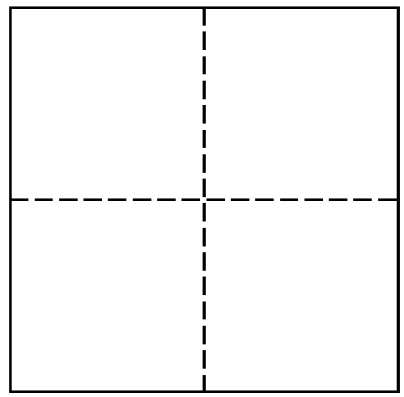
FIG. 7A to FIG. 7E show five different split types.

Quadtree (QT) split: A block is further split into four rectangular blocks of a same size. FIG. 7A shows an example of a quadtree split. According to a CTU splitting method based on a quadtree QT, a CTU is used as a root node (root) of a quadtree. The CTU is recursively split into several leaf nodes (leaf node) based on a quadtree split mode. One node corresponds to one picture region. If a node is not split, the node is referred to as a leaf node, and a picture region corresponding to the node becomes a CU. If a node is split, a picture region corresponding to the node is split into four picture regions of a same size (the length and the width of the four regions are respectively half the length and the width of the split region), and each region corresponds to one node. Whether these nodes are further split needs to be separately determined. Whether a node is to be split is indicated by a split flag split_cu_flag that is in a bitstream and that corresponds to the node. A quadtree depth (qtDepth) of the root node is 0, and a quadtree depth of a child node is a quadtree depth of a parent node plus 1. For brevity of description, a size and a shape of a node in this application are a size and a shape of a picture region corresponding to the node, that is, the node is a rectangular region in a picture. A node obtained by splitting a node (node) in the coding tree may be referred to as a child node (child node) of the node, which is a child node for short.

More specifically, a 64×64 CTU node (with the quadtree depth of 0) may not be split based on split_cu_flag corresponding to the CTU node, and become a 64×64 CU; or may be split into four 32×32 nodes (with the quadtree depth of 1). Each of the four 32×32 nodes may be further split or not further split based on split_cu_flag corresponding to the node. If a 32×32 node continues to be split, four 16×16 nodes are generated (with the quadtree depth of 2). The rest may be deduced by analogy, until no node is further split. In this way, one CTU is split into one group of CUs. A minimum CU size (size) is specified in SPS. For example, 8×8 is the minimum CU size. In the foregoing recursive partitioning process, if a size of a node is equal to the minimum CU size (minimum CU size), the node is not to be further split by default, and a split flag of the node does not need to be included in a bitstream.

After it is learned, through parsing, that a node is a leaf node and the leaf node is a CU, coding information (including information such as a prediction mode and a transform coefficient of the CU, for example, a syntax structure coding_unit( ) in H.266) corresponding to the CU is further parsed. Then, decoding processing such as prediction, dequantization, inverse transform, and loop filtering is performed on the CU based on the coding information, to generate a reconstructed image corresponding to the CU. In a quadtree (QT) structure, the CTU can be split into a group of CUs of appropriate sizes based on a local picture feature. For example, a flat region is split into larger CUs, while a richly textured region is split into smaller CUs.

A mode of splitting a CTU into a group of CUs corresponds to a coding tree (coding tree). A specific coding tree that should be used by the CTU is usually determined by using a rate-distortion optimization (RDO) technology of an encoder. The encoder tries a plurality of CTU split modes, and each split mode corresponds to one rate distortion cost (RD cost). The encoder compares RD costs of the split modes that are attempted, to find a split mode with a minimum RD cost as an optimal split mode of the CTU, for actual coding of the CTU. The CTU split modes tried by the encoder all need to comply with a split rule specified by a decoder, so that the CTU split modes can be correctly identified by the decoder.

Figure 7B:
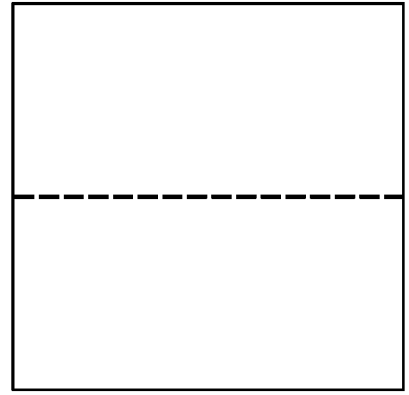

Vertical binary tree (BT) split: A block is vertically split into two rectangular blocks of a same size. FIG. 7B is an example of a vertical binary tree split.

Figure 7C:

Horizontal binary tree split: A block is horizontally split into two rectangular blocks of a same size. FIG. 7C is an example of a horizontal binary tree split.

Figure 7D:
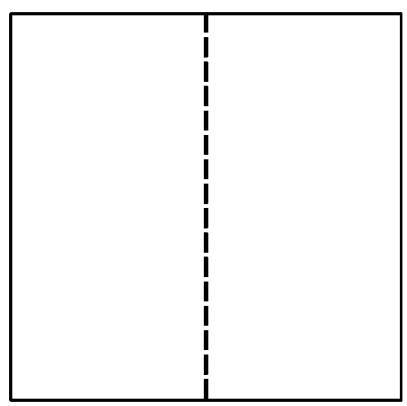

Vertical center-side ternary tree (TT) split: A block is vertically split into three rectangular blocks, so that two side blocks are of a same size, and a size of a center block is a sum of the sizes of the two side blocks. FIG. 7D is an example of a vertical center-side ternary tree split.

Figure 7E:
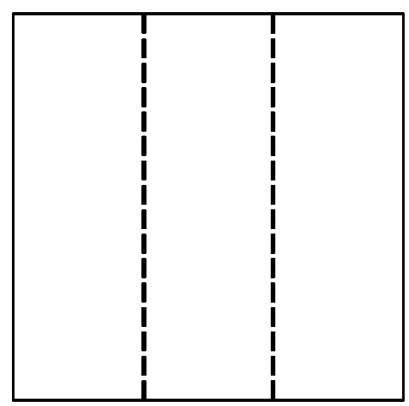

Horizontal center-side ternary tree split: A block is horizontally split into three rectangular blocks so that two side blocks are of a same size, and a size of a center block is a sum of the sizes of the two side blocks. FIG. 7E is an example of a horizontal center-side ternary tree split.

Figure 8:
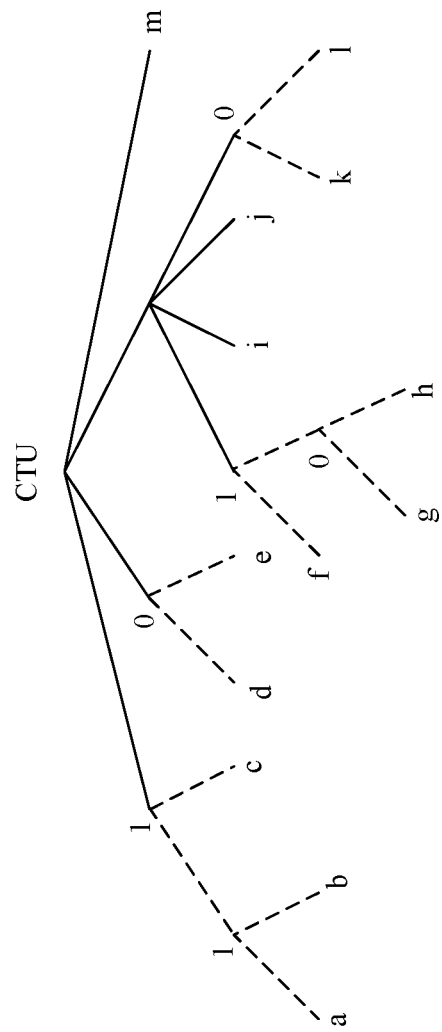
FIG. 8 shows a quadtree plus binary tree split mode.
Figure 8:
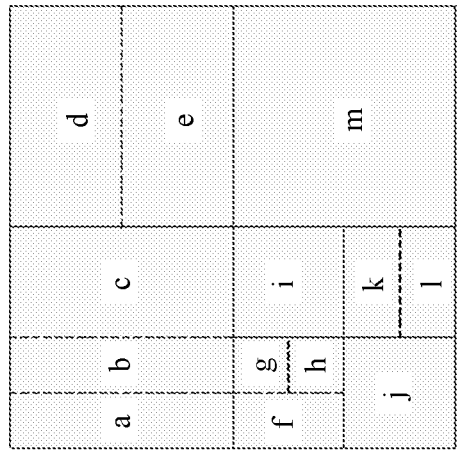

Specific split methods in FIG. 7B to FIG. 7E are similar to descriptions in FIG. 7A, and details are not described herein again. In addition, a split mode of cascading a QT and a BT/TT may be used, which is QT-BTT for short. That is, a node in a level-1 coding tree can be split into child nodes only through QT, and a leaf node in the level-1 coding tree is a root node of a level-2 coding tree; a node in the level-2 coding tree may be split into child nodes by using one of the following four split modes: a horizontal binary split, a vertical binary split, a horizontal ternary split, and a vertical ternary split; a leaf node of the level-2 coding tree is a coding unit. Specifically, a binary tree split and a quadtree split are performed in a cascading manner, which may be a QTBT split mode for short. For example, a CTU is first split through a QT, and a QT leaf node is allowed to continue to be split through a BT, as shown in FIG. 8. In the right part of FIG. 8, each endpoint represents one node. One node connecting to four solid lines represents a quadtree split, and one node connecting to two dashed lines represents a binary tree split. A node obtained after splitting may be referred to as a child node of the node, which is a child node for short. Among child nodes, a to m are 13 leaf nodes, and each leaf node represents one CU. On a binary tree node, 1 represents a vertical split, and 0 represents a horizontal split. A CTU is split into 13 CUs: a to m, as shown in the left part of FIG. 8. In the QTBT split mode, each CU has a QT depth (Quad-tree depth, QT depth) and a BT depth (Binary tree depth, BT depth). The QT depth represents a QT depth of a QT leaf node to which the CU belongs, and the BT depth represents a BT depth of a BT leaf node to which the CU belongs. For example, in FIG. 8, QT depths of a and b are 1, and BT depths of a and b are 2; QT depths of c, d, and e are 1, and BT depths of c, d, and e are 1; QT depths of f, k, and l are 2, and BT depths off, k, and l are 1; QT depths of i and j are 2, and BT depths of i and j are 0; QT depths of g and h are 2, and BT depths of g and h are 2; a QT depth of m is 1, and a BT depth of m is 0. If a CTU is split into only one CU, a QT depth of the CU is 0, and a BT depth of the CU is 0.

For a block associated with a specific depth, the encoder 20 determines which split type (including no further split) is used, and explicitly or implicitly (e.g., a split type may be derived from a predetermined rule) signals the determined split type to the decoder 30. The encoder 20 may determine a to-be-used split type based on a rate-distortion cost for checking a different split type for a block.

If a 2×M chroma block, especially a 2×2, 2×4, or 2×8 chroma block, is generated by splitting a node, chroma encoding and decoding efficiency is comparatively low, and processing costs of a hardware decoder is comparatively high. This is unfavorable to implementation of the hardware decoder. When the chroma block of the current node is not further split, in this embodiment of this application, only a luma block of the current node may be split, thereby improving encoding and decoding efficiency, reducing a maximum throughput of a codec, and facilitating implementation of the codec. Specifically, in this embodiment of this application, when child nodes generated by splitting a node by using a split mode include a chroma block whose side length is a first threshold (or includes a chroma block whose side length is less than a second threshold), the luma block included in the node is split by using this split mode, a chroma block included in the node is not further split. This mode can avoid generation of a chroma block whose side length is the first threshold (or whose side length is less than the second threshold). In a specific implementation, the first threshold may be 2, and the second threshold may be 4. The following provides detailed descriptions with reference to Embodiments 1 to 3. In this embodiment of this application, descriptions are provided by using a video data format of YUV4:2:0, and a similar manner may be used for YUV4:2:2 data.

An intra block copy (IBC) coding tool is adopted in an extended standard SCC of HEVC, and is mainly used to improve coding efficiency of a screen content video. The IBC mode is a block-level coding mode. On an encoder side, a block matching (BM) method is used to find an optimal block vector or motion vector for each CU. The motion vector herein is mainly used to represent a displacement from the current block to a reference block, and is also referred to as a displacement vector. The reference block is a reconstructed block in the current picture. The IBC mode may be considered as a third prediction mode other than the intra prediction mode or the inter prediction mode. To save storage space and reduce complexity of the decoder, the IBC mode in VTM4 allows only a reconstructed part of a predefined region of the current CTU to be used for prediction.

In VTM, at a CU level, a flag is used to indicate whether an IBC mode is used for a current CU. The IBC mode is classified into an IBC AMVP mode, an IBC skip mode, or an IBC merge mode.

Embodiment 1

Figure 9:
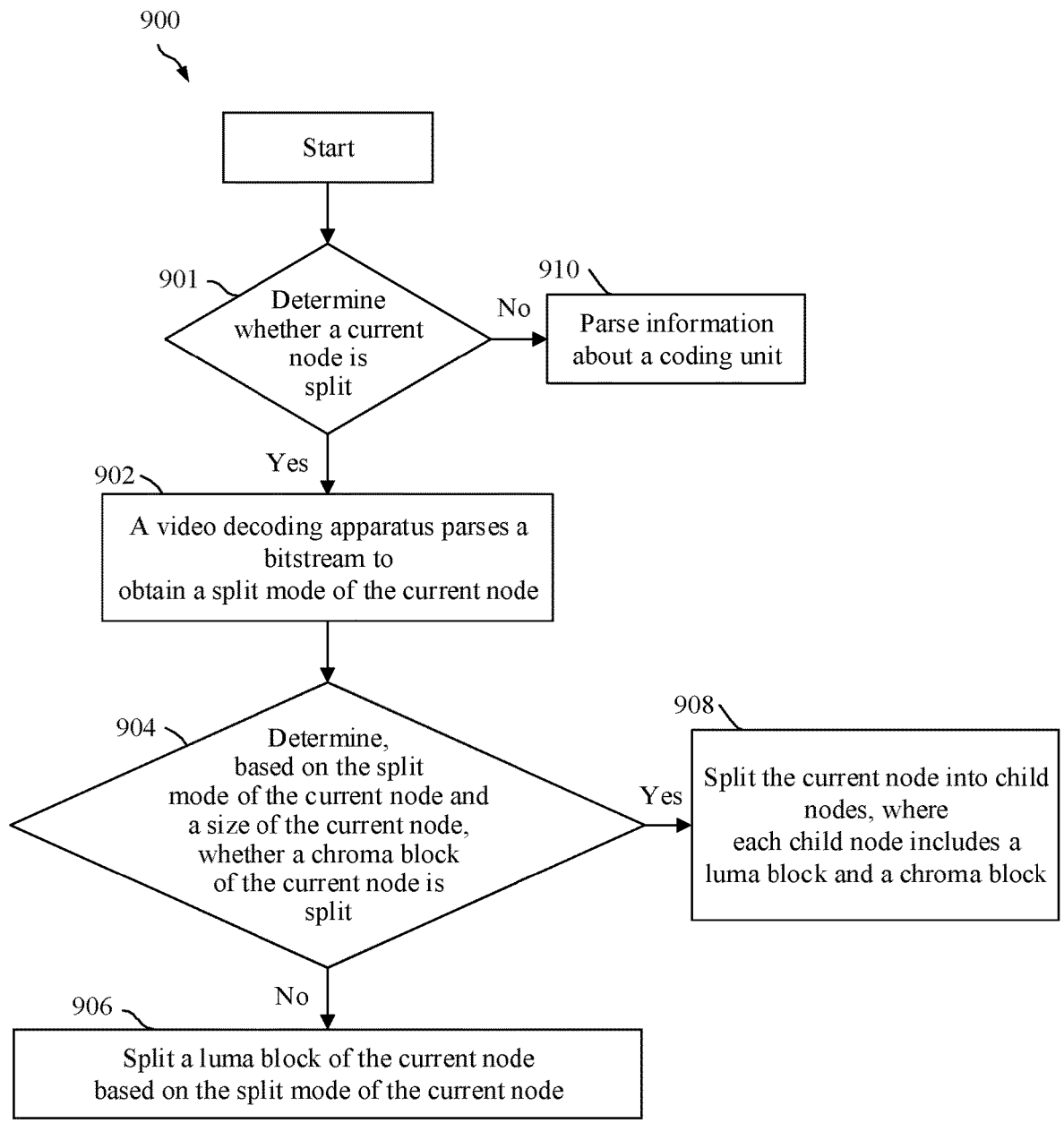
FIG. 9 is a flowchart of a method according to Embodiment 1 of the present invention.

FIG. 9 is a flowchart of a method 900 according to Embodiment 1 of the present invention.

Step 901: Determine whether a current node needs to be split, where the current node includes a luma block and a chroma block.

If the current node is not further split into child nodes, the current node is a coding unit (CU), and step 910 is performed to obtain information about the coding unit through parsing; or if the current node needs to be split, step 902 is performed.

Embodiment 1 of the present invention may be implemented by a video decoding apparatus, to be specific, the apparatus described in any one of FIG. 3 to FIG. 5.

Embodiment 1 of the present invention may alternatively be implemented by a video encoding apparatus, to be specific, the apparatus described in any one of FIG. 2, FIG. 4, and FIG. 5.

When Embodiment 1 is implemented by the video decoding apparatus, step 902 is: The video decoding apparatus parses a bitstream to determine a split mode of the current node. The split mode of the current node may be at least one of a quad split (QT), a horizontal binary split (horizontal BT), a horizontal ternary split (horizontal TT), a vertical binary split (Vertical BT), and a vertical ternary split (Vertical TT), or may be another split mode. This is not limited in this illustrative example of the present invention. Information about the split mode of the current node is usually transmitted in the bitstream, and the split mode of the current node can be obtained by parsing a corresponding syntax element in the bitstream.

When Embodiment 1 is implemented by the video encoding apparatus, step 902 is: Determine a method for splitting the current node.

Step 904: Determine, based on the split mode of the current node and a size of the current node, whether the chroma block of the current node needs to be split; and when the chroma block of the current node is not further split, perform step 906; or when the chroma block of the current node needs to be split, perform step 908.

Specifically, in an implementation, it may be determined whether a chroma block whose side length is a first threshold (or a chroma block whose side length is less than a second threshold) is generated by splitting the current node based on the split mode of the current node. If it is determined that a child node generated by splitting the current node includes the chroma block whose side length is the first threshold (or include the chroma block whose side length is less than the second threshold), the chroma block of the current node is not further split. For example, the first threshold may be 2, and the second threshold may be 4.

In this illustrative example of the present invention, the chroma block whose side length is the first threshold is a chroma block whose width or height is the first threshold.

In another implementation, for example, when any one of condition 1 to condition 5 is true, it may be determined that the chroma block of the current node is not further split; otherwise, it is determined that the chroma block of the current node needs to be split:

condition 1: The width of the current node is equal to twice a second threshold, and the split mode of the current node is a vertical binary split;
condition 2: The height of the current node is equal to twice a second threshold, and the split mode of the current node is a horizontal binary split;
condition 3: The width of the current node is equal to four times a second threshold, and the split mode of the current node is a vertical ternary split;
condition 4: The height of the current node is equal to four times a second threshold, and the split mode of the current node is a horizontal ternary split; or
condition 5: The width of the current node is equal to twice a second threshold, and the split mode of the current node is a quad split.

Generally, the width of the current node is the width of the luma block corresponding to the current node, and the height of the current node is the height of the luma block corresponding to the current node. In a specific implementation, for example, the second threshold may be 4.

In a third implementation, it may be determined whether a chroma block whose width is a first threshold (or a chroma block whose width is less than a second threshold) is generated by splitting the current node based on the split mode of the current node. If it is determined that a child node generated by splitting the current node includes the chroma block whose width is the first threshold (or include the chroma block whose width is less than the second threshold), the chroma block of the current node is not further split. For example, the first threshold may be 2, and the second threshold may be 4.

In a fourth implementation, it may be determined whether a chroma block whose chroma sample quantity is less than a third threshold is generated by splitting the current node based on the split mode of the current node. If it is determined that a child node generated by splitting the current node includes a chroma block whose chroma sample quantity is less than the third threshold, the chroma block of the current node is not further split. For example, the third threshold may be 16. In this case, a chroma block whose chroma sample quantity is less than 16 includes but is not limited to a 2×2 chroma block, a 2×4 chroma block, and a 4×2 chroma block. The third threshold may be 8. In this case, a chroma block whose chroma sample quantity is less than 8 includes but is not limited to a 2×2 chroma block.

Specifically, if either condition 1 or condition 2 is true, it may be determined that the chroma block whose chroma sample quantity is less than the third threshold is generated by splitting the current node based on the split mode of the current node; otherwise, it may be determined that no chroma block whose chroma sample quantity is less than the third threshold is generated by splitting the current node based on the split mode of the current node:

condition 1: A product of the width and the height of the current node is less than 128, and the split mode of the current node is a vertical binary split or a horizontal binary split; or
condition 2: A product of the width and the height of the current node is less than 256, and the split mode of the current node is a vertical ternary split, a horizontal ternary split, or a quad split.

Specifically, in another implementation, if either condition 3 or condition 4 is true, it may be determined that the chroma block whose chroma sample quantity is less than a third threshold is generated by splitting the current node based on the split mode of the current node; otherwise, it may be determined that no chroma block whose chroma sample quantity is less than the third threshold is generated by splitting the current node based on the split mode of the current node:

condition 3: A product of the width and the height of the current node is equal to 64, and the split mode of the current node is a vertical binary split, a horizontal binary split, a quad split, a horizontal ternary split, or a vertical ternary split; or
condition 4: A product of the width and the height of the current node is equal to 128, and the split mode of the current node is a vertical ternary split or a horizontal ternary split.

In a fifth implementation, it may be determined whether a chroma block whose height is a first threshold (or a chroma block whose height is less than a second threshold) is generated by splitting the current node based on the split mode of the current node. If it is determined that a child node generated by splitting the current node includes a chroma block whose height is the first threshold (or a chroma block whose height is less than the second threshold), the chroma block of the current node is not further split. For example, the first threshold may be 2, and the second threshold may be 4.

Step 906: Split the luma block of the current node based on the split mode of the current node, to obtain the child nodes (which may also be referred to as child nodes of the luma block, luma nodes for short) of the current node. Each child node includes only a luma block. The chroma block of the current node is not further split, and becomes a coding unit including only the chroma block.

Figure 10:
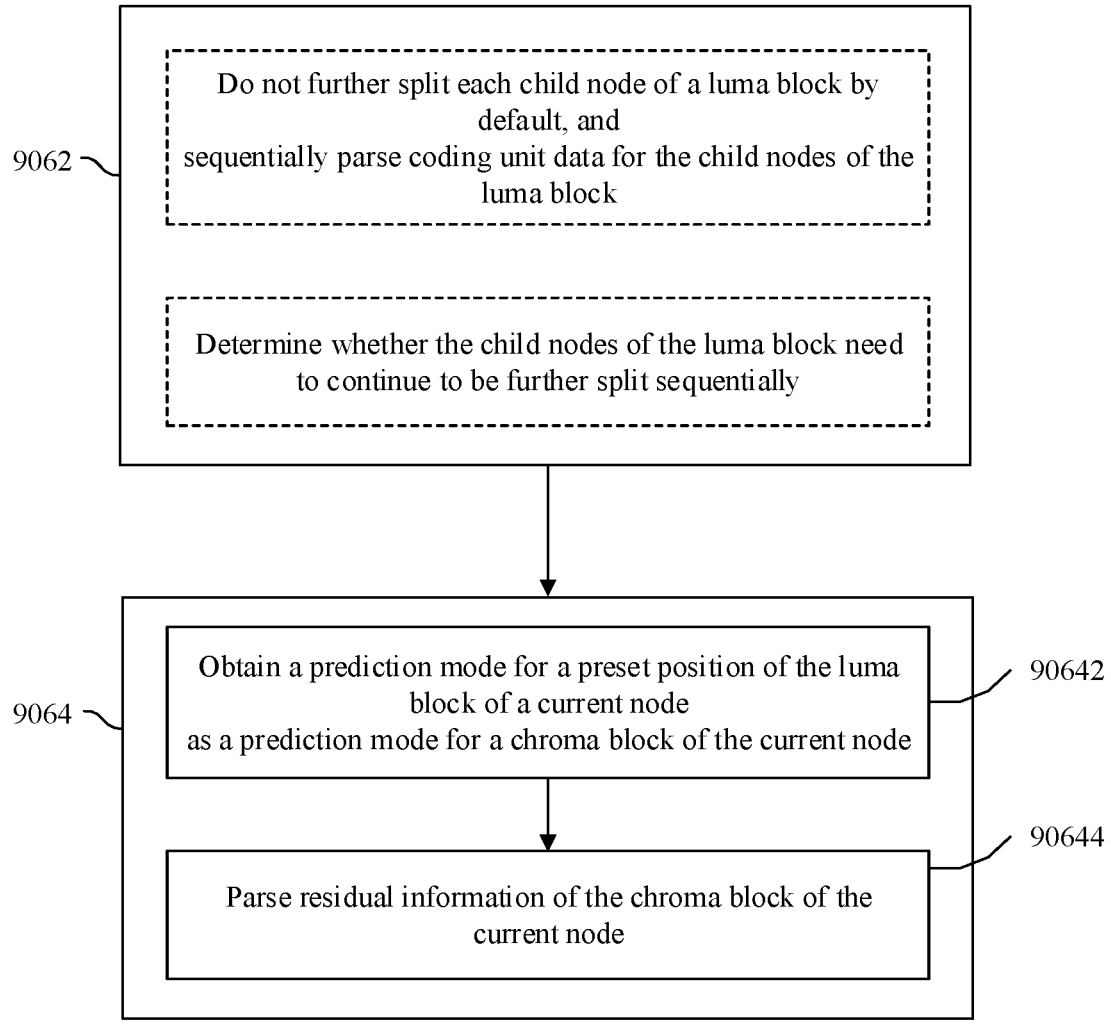
FIG. 10 is a flowchart of step 906 in Embodiment 1 of the present invention.

Optionally, as shown in FIG. 10, step 906 may further include step 9062: Parse the luma block of the current node, to obtain prediction information and residual information of each of sub-regions in the luma block of the current node, where each sub-region corresponds to one child node.

Specifically, step 9062 may be implemented by using any one of the following methods:

Method 1: Do not further split each child node of the luma block by default (that is, each luma node is a coding unit, and one child node of the luma block corresponds to one coding unit including only a luma block), and sequentially parse coding unit data for the child nodes of the luma block, to obtain prediction information and residual information of each luma block. A luma block of a luma node is a sub-region in the luma block of the current node, and luma blocks of the luma nodes constitute the luma block of the current node.

Method 2: Determine whether the child nodes of the luma block need to continue to be further split sequentially; and when the child nodes need to be further split, parse a split mode of the child nodes and corresponding coding unit data. More specifically, if a luma node is not further split, coding unit data corresponding to the luma node is parsed, to obtain prediction information and residual information that correspond to a luma block of the luma node; or if a luma node continues to be split, whether child nodes (it should be noted that the child node still includes only a luma block) of the luma node need to be split continues to be determined, until prediction information and residual information of each of sub-regions of the luma block of the current node are determined.

The prediction information includes but is not limited to a prediction mode (indicating an intra prediction mode or an inter prediction mode), an intra prediction mode, motion information, and/or the like. The intra prediction mode of the luma block may be one of a planar mode, a direct current mode (DC Mode), an angular mode, and a chroma derived mode (DM). The motion information may include information such as a prediction direction (forward, backward, or bidirectional), a reference index, and/or a motion vector.

The residual information includes a coded block flag (CBF), a transform coefficient, and/or a transform type (e.g., DCT-2, DST-7, or DCT-8), and the like.

Optionally, as shown in FIG. 10, step 906 may further include step 9064: Obtain prediction information and/or residual information of the chroma block.

Specifically, step 9064 may include step 90642 and step 90644. Step 90642 may be step 90642A or step 90642B.

Step 90642A specifically includes:

Obtain a prediction mode for a preset position of the luma block of the current node as the prediction mode of the chroma block of the current node. A position of the top-left corner of the luma block of the current node may be expressed as (x0, y0), and a size is W×H. In this case, the preset position may include but is not limited to the top-left corner, the bottom-right corner (x0+W−1, y0+H−1), the center (x0+W/2, y0+H/2), (x0+W/2, 0), or (0, y0+H/2) of the luma block, or the like. The prediction mode indicates whether intra prediction or inter prediction is performed on a pixel in the preset position, for example, information indicated by a syntax element pred_mode_flag in HEVC. For example, in VTM, whether the prediction mode for the preset position is an IBC mode may be determined based on information indicated by a syntax element pred_mode_ibc_flag.

If the prediction mode for the preset position is inter prediction, one of the following methods is used to determine the prediction mode of the chroma block:

Method 1: Perform inter prediction on the chroma block to obtain motion information for the preset position as motion information of the chroma block.

Method 2: Perform inter prediction on the chroma block, and split the chroma block into chroma prediction sub-blocks (where a size of the chroma prediction sub-block is, for example, two chroma samples in width and two chroma samples in height), and obtain motion information of the chroma prediction sub-blocks in the following manner:

If inter prediction is performed on luma blocks in luma picture positions corresponding to the chroma prediction sub-blocks, motion information of the luma picture positions corresponding to the chroma prediction sub-blocks is used as the motion information of the chroma prediction sub-blocks; otherwise, motion information for the preset position is obtained as the motion information of the chroma prediction sub-blocks.

For a YUV4:2:0 picture, coordinates of a chroma prediction sub-block in a chroma picture are denoted as (xC, yC). In this case, coordinates of a luma picture position corresponding to the chroma prediction sub-block are (xC<<1, yC<<1).

Method 3: Parse a flag pred_mode_flag, to determine whether intra prediction or inter prediction is performed on the chroma block; and if intra prediction is performed on the chroma block, parse an intra prediction mode from a bitstream as an intra prediction mode of the chroma block; or if inter prediction is performed on the chroma block, obtain motion information for a preset position as the motion information of the chroma block.

Method 4: Parse a flag pred_mode_flag, to determine whether intra prediction or inter prediction is performed on the chroma block; and if intra prediction is performed on the chroma block, parse an intra prediction mode from a bitstream as an intra prediction mode of the chroma block, where the intra prediction mode may be one of a cross-component linear model mode and a DM mode, and a luma intra prediction mode corresponding to the DM mode is set to a planar mode; or if inter prediction is performed on the chroma block, split the chroma block into chroma prediction sub-blocks, where motion information of the chroma prediction sub-blocks is obtained in the following manner:

If inter prediction is performed on luma blocks in luma picture positions corresponding to the chroma prediction sub-blocks, motion information of the luma picture positions corresponding to the chroma prediction sub-blocks is used as the motion information of the chroma prediction sub-blocks; otherwise, motion information for the preset position is obtained as the motion information of the chroma prediction sub-blocks.

A context model used to parse the flag pred_mode_flag is a preset model, for example, with a model number 2.

If the prediction mode for the preset position is intra prediction, intra prediction is performed on the chroma block, and an intra prediction mode is parsed from the bitstream as the intra prediction mode of the chroma block. Alternatively, it is directly determined that the intra prediction mode of the chroma block is one of a direct current mode, a planar mode, an angular mode, a cross-component linear model mode, or a DM mode.

If the prediction mode for the preset position is an IBC mode, the chroma block is predicted in the IBC mode, to obtain displacement vector information for the preset position as displacement vector information of the chroma block; or if the prediction mode for the preset position is an IBC mode, the prediction mode of the chroma block is determined based on the flag pred_mode_ibc_flag: 1) if pred_mode_ibc_flag is 1, the IBC mode is used for the chroma block; more specifically, a method for predicting the IBC for the chroma block may be a method in VTM 4.0, that is, the chroma block is split into 2×2 sub-blocks, and a displacement vector of each sub-block is equal to a displacement vector of a luma region corresponding to the sub-block; or 2) if pred_mode_ibc_flag is 0, an intra prediction mode or an inter prediction mode is used for the chroma block.

When the intra prediction mode is used, a syntax element is parsed from the bitstream, to determine a chroma intra prediction mode. Alternatively, it is directly determined that the intra prediction mode of the chroma block belongs to a chroma intra prediction mode set. The chroma intra prediction mode set include a direct current mode, a planar mode, an angular mode, a cross-component linear model, and a DM mode.

When the inter prediction mode is used, motion information for the preset position may be obtained as the motion information of the chroma block.

It should be noted that, when there is no pred_mode_ibc_flag in the bitstream, if a type of a picture in which the current node is located is an I-frame/I-slice and an IBC mode is allowed for use, pred_mode_ibc_flag is 1 by default, that is, the IBC mode is used for the chroma block by default; or if a type of a picture in which the current node is located is a P/B-frame/slice, pred_mode_ibc_flag is 0 by default.

In VTM, whether the prediction mode for the preset position is an IBC mode may be determined based on information indicated by the syntax element pred_mode_ibc_flag. For example, if pred_mode_ibc_flag is 1, it indicates that the IBC prediction mode is used; or if pred_mode_ibc_flag is 0, it indicates that the IBC mode is not used. When there is no pred_mode_ibc_flag in the bitstream, if in the I-frame/I-slice, a value of pred_mode_ibc_flag is equal to a value of sps_ibc_enabled_flag; if in the P-frame/slice or the B-frame/slice, pred_mode_ibc_flag is 0. When sps_ibc_enabled_flag is 1, it indicates that the current picture is allowed to be used as a reference picture in a process of decoding the current picture; or when sps_ibc_enabled_flag is 0, it indicates that the current picture is not allowed to be used as a reference picture in a process of decoding the current picture.

The intra prediction mode of the chroma block may be one of a direct current mode, a planar mode, an angular mode, a cross-component linear model (CCLM) mode, and a chroma derived mode (DM), for example, a DC mode, a planar mode, an angular mode, a cross-component linear model mode, and a chroma derived mode in VTM.

Step 90642B specifically includes:

Obtain prediction modes for a plurality of luma blocks of the current node, and determine the prediction mode of the chroma block corresponding to the current node by using the following method:

If intra prediction is performed on all of the plurality of luma blocks, intra prediction is performed on the chroma block, and an intra prediction mode is parsed from a bitstream as the intra prediction mode of the chroma block.

If inter prediction is performed on all of the plurality of luma blocks, one of the following methods is used to determine a chroma prediction mode:

Method 1: Perform inter prediction on the chroma block to obtain motion information for the preset position as motion information of the chroma block. The preset position has the same meaning as that in Embodiment 1.

Method 2: Parse the flag pred_mode_flag to determine whether intra prediction or inter prediction is performed on the chroma block; and if intra prediction is performed on the chroma block, parse an intra prediction mode from the bitstream as the intra prediction mode of the chroma block; or if inter prediction is performed on the chroma block, obtain motion information for the preset position as the motion information of the chroma block.

If inter prediction and intra prediction are included for the plurality of luma blocks, the mode information of the chroma block may be determined in one of the following manners:

(1) if the prediction mode for the preset position is inter prediction, inter prediction is performed on the chroma block to obtain motion information for the preset position as the motion information of the chroma block;

(2) if the prediction mode for the preset position is intra prediction, intra prediction is performed on the chroma block, and an intra prediction mode is parsed from a bitstream as the intra prediction mode of the chroma block; or it is directly determined that the intra prediction mode of the chroma block is one of a direct current mode, a planar mode, an angular mode, a cross-component linear model mode, or a DM mode;

(3) if the prediction mode for the preset position is an IBC mode, the chroma block is predicted in the IBC mode, to obtain displacement vector information for the preset position as displacement vector information of the chroma block; and (4) the chroma prediction mode is directly specified as one mode in a mode set, where the mode set includes an AMVP mode, an IBC mode, a skip mode, a direct current mode, a planar mode, an angular mode, a cross-component linear model mode, and a DM mode.

Step 90644: Parse residual information of the chroma block. A residual information of the chroma block is included in a transform unit. A transform type may be DCT-2 by default.

Step 908: Split the current node into child nodes, where each child node includes a luma block and a chroma block. Step 901 is performed on each child node, and parsing continues to be performed for a split mode of the child node, to determine whether the child node (which is also referred to as a node) needs to be further split.

After a sub-region split mode of a luma block and prediction information and residual information of each of sub-regions are obtained, inter prediction processing or intra prediction processing may be performed on each sub-region based on a corresponding prediction mode of the sub-region, to obtain an inter predicted picture or an intra predicted picture of the sub-region. Then, dequantization and inverse transform processing are performed on a transform coefficient based on the residual information of each of sub-regions to obtain a residual picture, and the residual picture is superimposed on a predicted picture in the corresponding sub-region, to generate a reconstructed picture of the luma block.

After prediction information and residual information of a chroma block are obtained, inter prediction processing or intra prediction processing may be performed on the chroma block based on a prediction mode of the chroma block, to obtain an inter predicted picture or an intra predicted picture of the chroma block. Then, dequantization and inverse transform processing are performed on a transform coefficient based on the residual information of the chroma block to obtain a residual picture, and the residual picture is superimposed on a predicted picture of the chroma block to generate a reconstructed picture of the chroma block.

In Embodiment 1 of the present invention, when the chroma block of the current node is not further split, the method may be used to split only the luma block of the current node, thereby improving encoding and decoding efficiency, reducing a maximum throughput of a codec, and facilitating implementation of the codec.

Embodiment 2

Compared with Embodiment 1, the following constraint is added to step 9062: A same prediction mode is used for the luma nodes (that is, the child nodes of the luma blocks), that is, intra prediction or inter prediction is performed on each luma node. Other steps are similar to those in Embodiment 1, and details are not described again.

Any one of the following methods may be used for using the same prediction mode for the luma nodes:

Method 1: If the current frame is an I-frame, intra prediction is performed on all child nodes of the current node by default; or if the current frame is a P-frame or a B-frame, a first node (which may be a first child node for short) on which parsing processing is performed is parsed to obtain a prediction mode of the first node, and a prediction mode of a remaining child node (which is a luma node for short) is by default the prediction mode of the first node on which parsing processing is performed; or method 2: If the current frame is an I-frame, intra prediction is performed on all child nodes of the current node by default; or if the current frame is a P-frame or a B-frame, inter prediction is performed on all child nodes of the current node by default.

Embodiment 3

Figure 11:
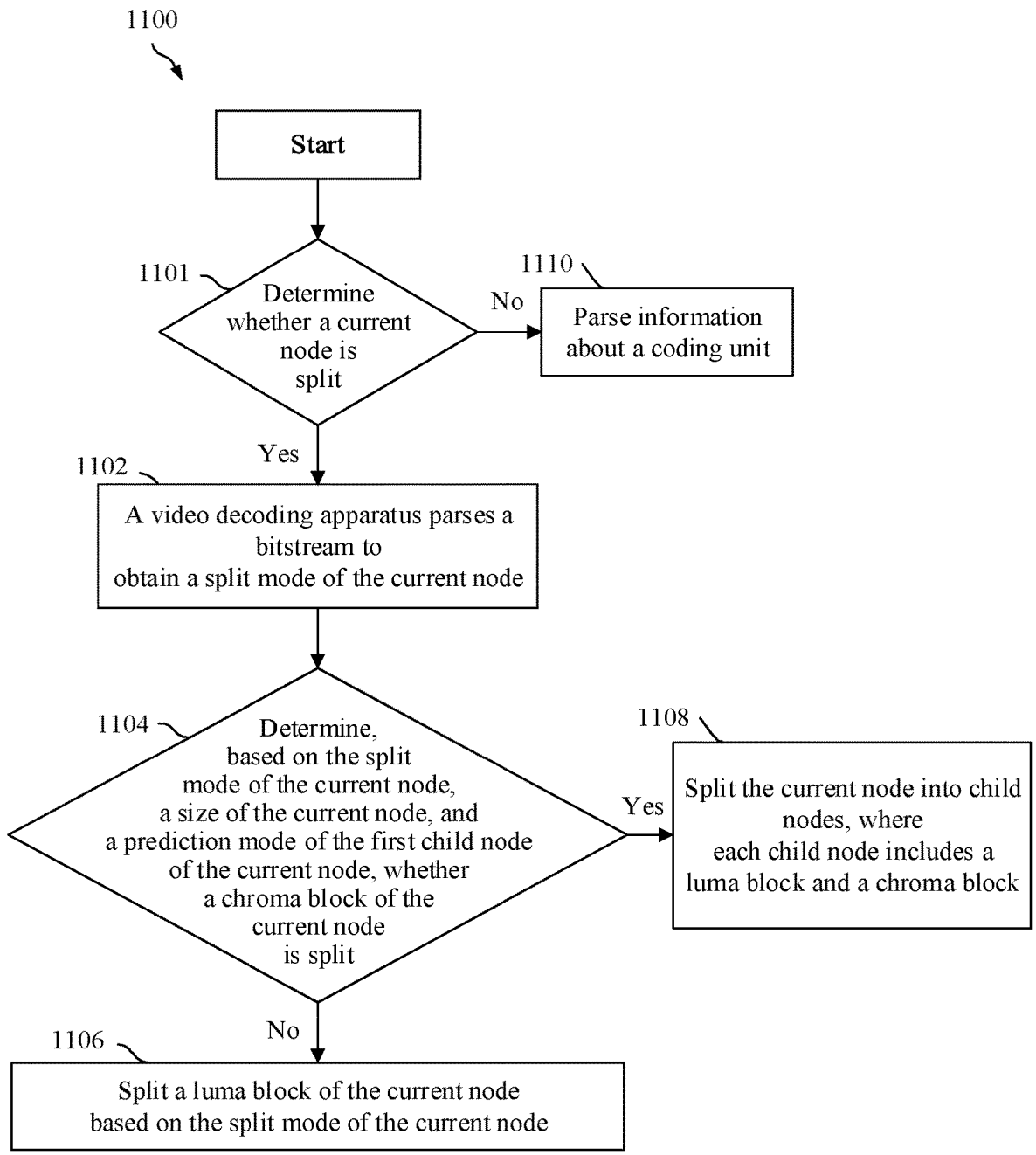
FIG. 11 shows a flowchart of a method according to Embodiment 3 of the present invention.

FIG. 11 is a flowchart 1100 of a method according to Embodiment 3 of the present invention. Embodiment 3 is similar to Embodiment 1, except step 1104.

Step 1104: Determine, based on a split mode of the current node, a size of the current node, and a prediction mode of the first node on which parsing processing is performed (which may be the first child node for short) in the current node, whether the chroma block of the current node is split, where the first child node includes only a luma block. A same prediction mode is performed on a plurality of child nodes of the current node. Each child node includes only a luma block.

Whether the split mode of the current node and the size of the current node are first determined or the prediction mode of the first child node is first determined is not limited in this illustrative example of the present invention.

Based on Embodiment 1 or 2, in Embodiment 3, a split mode of the chroma block of the current node, a corresponding prediction information parsing mode, and a corresponding residual information parsing mode are determined with reference to the prediction mode of the first child node of the current node.

In an implementation, it is determined, based on the split mode of the current node and the size of the current node, that a child node generated by splitting the current node includes a chroma block whose side length is equal to a first threshold or whose side length is less than a second threshold, and a prediction mode of the first child node is intra prediction; in this case, the chroma block of the current node is not further split. Similar to Embodiment 1, for example, the first threshold may be 2, and the second threshold may be 4.

In this illustrative example of the present invention, the chroma block whose side length is the first threshold is a chroma block whose width or height is the first threshold.

In another implementation, when the prediction mode of the first child node is intra prediction, and any one of condition 1 to condition 5 is true:

condition 1: The width of the current node is equal to twice a second threshold, and the split mode of the current node is a vertical binary split;

condition 2: The height of the current node is equal to twice a second threshold, and the split mode of the current node is a horizontal binary split;

condition 3: The width of the current node is equal to four times a second threshold, and the split mode of the current node is a vertical ternary split;

condition 4: The height of the current node is equal to four times a second threshold, and the split mode of the current node is a horizontal ternary split; or condition 5: If the width of the current node is equal to twice a second threshold and the split mode of the current node is a quad split, the chroma block of the current node is not further split.

Generally, the width of the current node is the width of the luma block corresponding to the current node, and the height of the current node is the height of the luma block corresponding to the current node. In a specific implementation, for example, the second threshold may be 4.

When the prediction mode of the first child node is intra prediction, similar to the first embodiment, in a third implementation, it may be determined whether a chroma block whose width is the first threshold (or a chroma block whose width is less than the second threshold) is generated by splitting the current node based on the split mode of the current node. If it is determined that a child node generated by splitting the current node includes a chroma block whose width is the first threshold (or a chroma block whose width is less than the second threshold), and the prediction mode of the first child node is intra prediction, the chroma block of the current node is not further split. For example, the first threshold may be 2, and the second threshold may be 4.

When the prediction mode of the first child node is intra prediction, similar to the first embodiment, in a fourth implementation, it may be determined whether a chroma block whose chroma sample quantity is less than a third threshold is generated by splitting the current node based on the split mode of the current node. If it is determined that a child node generated by splitting the current node includes a chroma block whose chroma sample quantity is less than the third threshold, and the prediction mode of the first child node is intra prediction, the chroma block of the current node is not further split. For example, the third threshold may be 16. In this case, a chroma block whose chroma sample quantity is less than 16 includes but is not limited to a 2×2 chroma block, a 2×4 chroma block, and a 4×2 chroma block. The third threshold may be 8. In this case, a chroma block whose chroma sample quantity is less than 8 includes but is not limited to a 2×2 chroma block.

Specifically, if either condition 1 or condition 2 is true, it may be determined that the chroma block whose chroma sample quantity is less than the third threshold is generated by splitting the current node based on the split mode of the current node; otherwise, it may be determined that no chroma block whose chroma sample quantity is less than the third threshold is generated by splitting the current node based on the split mode of the current node:

condition 1: A product of the width and the height of the current node is less than 128, and the split mode of the current node is a vertical binary split or a horizontal binary split; or condition 2: A product of the width and the height of the current node is less than 256, and the split mode of the current node is a vertical ternary split, a horizontal ternary split, or a quad split.

Specifically, in another implementation, if either condition 3 or condition 4 is true, it may be determined that the chroma block whose chroma sample quantity is less than a third threshold is generated by splitting the current node based on the split mode of the current node; otherwise, it may be determined that no chroma block whose chroma sample quantity is less than the third threshold is generated by splitting the current node based on the split mode of the current node:

condition 3: A product of the width and the height of the current node is equal to 64, and the split mode of the current node is a vertical binary split, a horizontal binary split, a quad split, a horizontal ternary split, or a vertical ternary split; or condition 4: A product of the width and the height of the current node is equal to 128, and the split mode of the current node is a vertical ternary split or a horizontal ternary split.

When the prediction mode of the first child node is intra prediction, similar to the first embodiment, in a fifth implementation, it may be determined whether a chroma block whose height is a first threshold (or a chroma block whose height is less than a second threshold) is generated by splitting the current node based on the split mode of the current node. If it is determined that a child node generated by splitting the current node includes a chroma block whose height is the first threshold (or a chroma block whose height is less than the second threshold), and the prediction mode of the first child node is intra prediction, the chroma block of the current node is not further split. For example, the first threshold may be 2, and the second threshold may be 4.

If the chroma block of the current node is not further split, the chroma block of the current node becomes a coding unit including only a chroma block. The method 1100 may further include: obtaining prediction information and/or residual information of the chroma block.

In another implementation, it is determined, based on the split mode of the current node and the size of the current node, that a child node generated by splitting the current node includes a chroma block whose side length is less than a threshold. If the prediction mode of the first child node is inter prediction, the chroma block of the current node is split based on the split mode of the current node. Optionally, motion information of a corresponding child node of the chroma block is determined based on motion information of a child node of the current node. For example, motion information of a child node of the chroma block of the current node may be set as motion information of a corresponding luma node (that is, motion information of each child node of the chroma block does not need to be parsed from the bitstream). Child nodes of the chroma block are parsed to obtain residual information of the child nodes of the chroma block.

When the prediction mode of the first child node is inter prediction, and any one of the following conditions is true:

condition 1: The width of the current node is equal to twice a second threshold, and the split mode of the current node is a vertical binary split;

condition 2: The height of the current node is equal to twice a second threshold, and the split mode of the current node is a horizontal binary split;

condition 3: The width of the current node is equal to four times a second threshold, and the split mode of the current node is a vertical ternary split;

condition 4: The height of the current node is equal to four times a second threshold, and the split mode of the current node is a horizontal ternary split; or condition 5: If the width of the current node is equal to twice the second threshold and the split mode of the current node is a quad split, the chroma block of the current node still needs to be split.

Generally, the width of the current node is the width of the luma block corresponding to the current node, and the height of the current node is the height of the luma block corresponding to the current node. In a specific implementation, for example, the second threshold may be 4.

In Embodiment 3, a chroma block split mode, a corresponding prediction information parsing mode, and a corresponding residual information parsing mode may also be determined based on a prediction mode of a luma node. In this way, higher flexibility is achieved. In addition, when the prediction mode of the luma node is intra prediction, the chroma block of the current node is not further split, thereby improving chroma encoding and decoding efficiency, reducing a maximum throughput of a codec and facilitating implementation of the codec.

Some syntax structures at a CU level may be shown in Table 1. If the current node is not further split into child nodes, the current node is a coding unit, and a prediction block of the coding unit is parsed according to the following syntax structures.

skip_flag is a flag representing a skip mode. When a value of skip_flag is 1, it indicates that a skip mode is used for the current CU; or when a value of skip_flag is 0, it indicates that no skip mode is used for the current CU.

merge_flag is a flag representing a direct mode. When a value of merge_flag is 1, it indicates that a merge mode is used for the current CU; or when a value of merge_flag is 0, it indicates that no merge mode is used.

cu_pred_mode is a flag representing a prediction mode of a coding unit. When a value of cu_pred_mode is 1, it indicates that an intra prediction mode is used for the current coding unit; or when a value of cu_pred_mode is 0, it indicates that a common inter prediction mode is used for the current coding unit.

TABLE 1 coding_unit( x0, y0, uiDepth, uiWidth, uiHeight ) {
...
skip_flag
...

TABLE 1-continued

```
    if ( ! skipFlag ) {
       merge_flag
       ...
    }
    if ( ! mergeFlag )
       cu_pred_mode
       ...
}
```

Some syntax parsing at a CU level may be shown in Table 2. Table 2 is merely an example. In Table 2, a meaning of skip_flag is the same as that of skip_flag in Table 1, and a meaning of pred_mode_flag is the same as that of cu_pred_mode in Table 1.

cu_skip_flag is a flag representing a skip mode. When a value of cu_skip_flag is 1, it indicates that a skip mode is used for the current CU; or when a value of cu_skip_flag is 0, it indicates that no skip mode is used for the current CU.

merge_flag is a flag representing a direct mode. When a value of merge_flag is 1, it indicates that a merge mode is used for the current CU; or when a value of merge_flag is 0, it indicates that no merge mode is used.

pred_mode_flag is a flag representing a prediction mode of a coding unit. When a value of pred_mode_flag is 1, it indicates that an intra prediction mode is used for a current prediction unit; or when a value of pred_mode_flag is 0, it indicates that a common inter prediction mode is used for a current prediction unit. If the value of pred_mode_flag is 1, a value of CuPredMode[x0][y0] is MODE INTRA; or if the value of pred_mode_flag is 0, a value of CuPredMode[x0][y0] is MODE INTER.

TABLE 2

| | Descriptor |
|---|---|
| coding_unit(x0, y0, cbWidth, cbHeight, treeType) { | |
|   if(tile_group_type != I \|\| sps_ibc_enabled_flag) { | |
|     if(treeType != DUAL_TREE_CHROMA) | |
|       cu_skip_flag[x0][y0] | ae(v) |
|     if(cu_skip_flag[x0][y0] = = 0 && tile_group_type != I) | |
|       pred_mode_flag | ae(v) |
|     ... | |
|   } | |
|   if(CuPredMode[x0][y0] = = MODE_INTRA ) { | |
|     ... | |
|   } else if(treeType != DUAL_TREE_CHROMA) {/* MODE_INTER or MODE_IBC */ | |
|     if(cu_skip_flag[x0][y0] = = 0) | |
|       merge_flag[x0][y0] | ae(v) |
| coding_unit(x0, y0, cbWidth, cbHeight, treeType) { | |
|   ... | |
|   } | |
| } | |

A node with a size of 8×M (or M×8) is split into two child nodes with a size of 4×M (or M×4) in a vertical binary split (or horizontal binary split) mode. Similarly, a node with a size of 16×M (or M×16) is split into four child nodes with a size of 4×M (or M×4) and one child node with a size of 8×N (or N×8) in a vertically extended quad split (or horizontally extended quad split) mode. Similarly, a node with a size of 16×M (or M×16) is split in a vertical ternary split (or horizontal ternary split) mode to generate child nodes with a size of two 4×M (or M×4) and one child node with a size of 8×M (or M×8). For a data format of YUV4:2:0, a resolution of a chroma component is ½ of a luma component. That is, a 4×M node includes one 4×M luma block and two 2×(M/2) chroma blocks. For a hardware decoder, processing costs of small blocks (especially with a size of 2×2, 2×4, and 2×8) are comparatively high. However, in this split mode, small blocks with a size of 2×2, 2×4, and the like are generated, which is unfavorable to implementation of the hardware decoder. For the hardware decoder, processing complexity of the small blocks is comparatively high, which is specifically embodied in the following three aspects.

(1) Problems in intra prediction: In hardware design, to improve a processing speed, 16 pixels are usually simultaneously processed once for intra prediction, and a small block with a size of 2×2, 2×4, 4×2, or the like includes less than 16 pixels, reducing intra prediction processing performance.

(2) Problems in coefficient coding: In HEVC, transform coefficient coding is based on a coefficient group (CG) including 16 coefficients, but a small block with a size of 2×2, 2×4, 4×2, or the like includes four or eight transform coefficients. As a result, coefficient groups including four coefficients and eight coefficients need to be added to support coefficient encoding of these small blocks; consequently, implementation complexity is increased.

(3) Problems in inter prediction: inter prediction on a small block raises a comparatively high requirement on a data bandwidth, and also affects a decoding processing speed.

When a node is further split based on a split mode, and one of generated child nodes includes a chroma block whose side length is 2, a luma block included in the child node continues to be further split in this split mode, and a chroma block included in the child node is not further split. This mode can avoid generation of a chroma block whose side length is 2, reduce a maximum throughput of a decoder, and facilitate implementation of the decoder. In addition, a method for determining a chroma block prediction mode based on a luma block prediction mode is proposed, effectively improving coding efficiency.

The method provided in the illustrative example of the present invention may be applied to the video codec in the foregoing embodiment.

Embodiment 4

This embodiment relates to a block split mode in video decoding. A video data format in this embodiment is a YUV4:2:0 format. A similar mode may be used for YUV4:2:2 data.

Step 1: Parse a split mode S of a node A, where if the node A continues to be split, step 2 is performed; or if the current node is not further split into child nodes, the current node corresponds to one coding unit, and information about a coding unit is obtained through parsing.

The split mode of the node A may be at least one of a quadtree split, a vertical binary split, a horizontal binary split, a vertical ternary split, and a horizontal ternary split, or may be another split mode. The split mode of the node A is not limited in the illustrative example of the present invention. Split mode information of the current node may be transmitted in a bitstream, and the split mode of the current node may be obtained by parsing a corresponding syntax element in the bitstream. The split mode of the current node may alternatively be determined according to a preset rule, and is not limited in the illustrative example of the present invention.

Step 2: Determine whether a chroma block of at least one child node B in child nodes obtained by splitting the node A based on the split mode S is a small block (or whether the width, the height, and/or the split mode of the node A, and/or the width and the height of the node B meet at least one of the conditions). If a chroma block of at least one child node B in the child nodes obtained by splitting the node A is a small block, step 3 to step 6 are performed.

Specifically, one of the following methods may be used to determine whether a chroma block of at least one child node B of the node A is a sub-block:

(1) If a chroma block of at least one child node B of the node A has a size of 2×2, 2×4, or 4×2, the chroma block of the at least one child node B of the node A is a small block;

(2) if the width or height of a chroma block of at least one child node B of the node A is 2, the chroma block of the at least one child node B of the node A is a small block;

(3) if the node A includes 128 luma samples and a ternary tree split is performed on the node A, or the node A includes 64 luma samples and a binary tree split is performed on the node A, a quadtree split mode, or a ternary tree split mode, a chroma block of at least one child node B of the node A is a small block;

(4) if the node A includes 256 luma samples and the node is split in a ternary tree split mode or a quadtree split mode, or the node A includes 128 luma samples and the node is split in a binary tree split mode, a chroma block of at least one child node B of the node A is a small block;

(5) if the node A includes N1 luma samples and a ternary tree split is performed on the node A, where N1 is 64, 128, or 256;

(6) if the node A includes N2 luma samples and a quadtree split is performed on the node A, where N2 is 64 or 256; or (7) if the node A includes N3 luma samples and the node A is split in a binary tree split mode, where N3 is 64, 128, or 256.

It should be noted that, that the node A includes 128 luma samples may also be described as that an area of the current node is 128, or a product of the width and the height of the node A is 128. Details are not described herein.

Step 3: Restrict that intra prediction or inter prediction is performed on all coding units in a coverage area of the node A. For intra prediction and inter prediction on all the coding units, parallel processing on small blocks may be implemented by hardware, thereby improving encoding and decoding performance.

One of the following methods may be used to determine to perform intra prediction or inter prediction on all the coding units in the coverage area of the node A.

Method 1: Determining is performed based on a flag in a syntax table.

If a chroma block of at least one child node B obtained by splitting the node A based on the split mode S is a small block (and a chroma block of the node A is not a small block), a flag cons_pred_mode_flag is parsed from the bitstream. When a value of cons_pred_mode_flag is 0, it indicates that inter prediction is performed on all the coding units in the coverage area of the node A; or when a value of cons_pred_mode_flag is 1, it indicates that intra prediction is performed on all the coding units in the coverage area of the node A. cons_pred_mode_flag may be a syntax element that needs to be parsed in a block split process. When the syntax element is parsed, cu_pred_mode of the coding unit in the coverage area of the node A may be no longer parsed, and a value of cu_pred_mode is a default value corresponding to the value of cons_pred_mode_flag.

It should be noted that, if only an intra prediction mode can be used for the child nodes of the node A, for example, the node A is in an intra picture (that is, a type of a picture in which the node A is located is an intra type or an I-type), or the node A is in an intra picture and an IBC technology is not used for a sequence, a value of cons_pred_mode_flag is 1 by default, and cons_pred_mode_flag is not present in the bitstream. The IBC technology may belong to inter prediction, or may belong to intra prediction.

Method 2: Determining is performed based on a prediction mode of the first node in the region of the node A.

A prediction mode of the first coding unit B0 (where the prediction mode of the first coding unit B0 is not limited) in the region of the node A is parsed. If the prediction mode of the B0 is intra prediction, intra prediction is performed on all the coding units in the coverage area of the node A; or if the prediction mode of the B0 is inter prediction, inter prediction is performed on all the coding units in the coverage area of the node A.

Step 4: Determine a chroma block split mode and a luma block split mode of the node A based on a prediction mode used for the coding units in the coverage area of the node A.

If an intra prediction mode is used for all the coding units in the coverage area of the node A, a luma block of the node A is split based on the split mode S, to obtain N luma coding tree nodes; and a chroma block of the node A is not split, and corresponds to one chroma coding block (which is a chroma CB for short). The N luma coding tree nodes may be limited to no further split, or may be not limited. If a luma child node continues to be split, a split mode of the luma child node parsed, to perform a recursive split. When a luma coding tree node is not further split, the luma coding tree node corresponds to a luma coding block (which is a luma CB for short). A chroma transform block corresponding to a chroma CB and the chroma coding block have a same size, and a chroma prediction block and the chroma coding block have a same size.

If an inter prediction mode is used for all the coding units in the coverage area of the node A, the luma block and the chroma block of the node A are further split into N coding tree nodes including a luma block and a chroma block based on the split mode S, and the N coding tree nodes may continue to be split or may be not split, and correspond to coding units including a luma block and a chroma block.

Step 5: Parse prediction information and residual information of a CU obtained by splitting the node A.

The prediction information includes a prediction mode (indicating an intra prediction mode or a non-intra prediction mode), an intra prediction mode, an inter prediction mode, motion information, and the like. The motion information may include information such as a prediction direction (forward, backward, or bidirectional), a reference index, and a motion vector.

The residual information includes a coded block flag (CBF), a transform coefficient, a transform type (e.g., DCT-2, DST-7, DCT-8), and the like. The transform type may be DCT-2 by default.

If it is limited that only intra prediction can be performed on each CU obtained by splitting the node A, parsing of a prediction block of a luma CB obtained by splitting the node A includes: skip_flag, merge_flag, and cu_pred_mode are set respectively to 0, 0, and 1 (that is, none of skip_flag, merge_flag, and cu_pred_mode are present in the bitstream), or skip_flag and cu_pred_mode are set respectively to 0 and 1 by default (that is, none of skip_flag and cu_pred_mode are present in the bitstream), and intra prediction mode information of the luma CB is parsed; parsing of a prediction block of a chroma CB obtained by splitting the node A includes: parsing an intra prediction mode of the chroma CB. A method for parsing the intra prediction mode of the chroma CB may be: (1) parsing a syntax element from the bitstream to obtain the intra prediction mode of the chroma CB; and (2) directly setting the intra prediction mode of the chroma CB to one prediction mode in a chroma intra prediction mode set, for example, one of a cross-component linear model mode, a DM mode (DM), or an IBC mode.

If it is limited that only inter prediction can be performed on each CU obtained by splitting the node A, parsing of a prediction mode of a CU obtained by splitting the node A includes: parsing skip_flag or/and merge_flag, setting cu_pred_mode to 0 by default, and obtaining, through parsing, an inter prediction block such as a merge index, an inter prediction direction (inter dir), a reference index, a motion vector predictor index, and a motion vector difference.

A skip_flag is a flag representing a skip mode. When a value of skip_flag is 1, it indicates that a skip mode is used for the current CU; or when a value of skip_flag is 0, it indicates that no skip mode is used for the current CU. merge_flag is a flag representing a merge mode. When a value of merge_flag is 1, it indicates that a merge mode is used for the current CU; or when a value of merge_flag is 0, it indicates that no merge mode is used. cu_pred_mode is a flag representing a prediction mode of a coding unit. When a value of cu_pred_mode is 1, it indicates that intra prediction is performed on a current prediction unit; or when a value of cu_pred_mode is 0, it indicates that common inter prediction is performed on a current prediction unit (information such as an inter prediction direction, a reference index, a motion vector predictor index, and a motion vector difference component is identified in the bitstream).

It should be noted that, in this embodiment, the intra prediction mode is a prediction mode for generating a predictor of a coding block by using a spatial reference pixel of a picture in which the coding block is located, for example, a direct current mode (DC mode), a planar mode, or an angular mode, or may include a template matching mode and an IBC mode.

The inter prediction mode is a prediction mode for generating a predictor of a coding block by using a temporal reference pixel in a reference picture of the coding block, for example, a skip mode, a merge mode, an AMVP (advanced motion vector prediction) mode or a common Inter mode, or an IBC mode.

Step 6: Decode each CU to obtain a reconstructed signal of a picture block corresponding to the node A.

For example, a prediction block of each CU performs inter prediction processing or intra prediction processing on the CU, to obtain an inter predicted picture or an intra predicted picture of the CU. Then, dequantization and inverse transform processing are performed on a transform coefficient based on residual information of each CU to obtain a residual picture, and the residual picture is superimposed on a predicted picture in a corresponding region to generate a reconstructed picture.

According to the split mode in Embodiment 4, no small chroma block on which intra prediction is performed is generated, thereby resolving problems in intra prediction of small blocks.

Embodiment 5

Step 1, step 2, step 3, and step 6 in this embodiment are the same as those in Embodiment 4.

Step 4: Determine a chroma block split mode and a luma block split mode of the node A.

A luma block of the node A continues to be split based on the split mode S, to generate N luma coding tree nodes. A chroma block of the node A is not further split, and corresponds to one chroma coding block (chroma CB). A chroma transform block corresponding to a chroma CB and the chroma code block have a same size. [Note: Compared with Embodiment 4, in this embodiment, regardless of whether an inter prediction mode or an intra prediction mode is used is limited, the chroma block is always not split, and the luma block is always split based on the split mode S regardless of a prediction mode for the coverage area of the node A.]

Step 5: Parse a prediction block and residual information of a CU obtained by splitting the node A.

If it is limited that only intra prediction can be performed on each CU obtained by splitting the node A, processing is the same as that in Embodiment 4.

If it is limited that only inter prediction can be performed on each CU obtained by splitting the node A, parsing of a prediction mode of a luma CB obtained by splitting the node A includes: parsing skip_flag or/and merge_flag, setting cu_pred_mode to 0 by default, and obtaining, through parsing, an inter prediction block such as a merge index, an inter prediction direction (inter dir), a reference index, a motion vector predictor index, and a motion vector difference. Motion information of each 4×4 sub-block in the luma CB is derived from the inter prediction block obtained through parsing.

If it is limited that only inter prediction can be performed on each CU obtained by splitting the node A, a prediction block of a chroma CB obtained by splitting the node A does not need to be parsed, and the chroma CB is split into 2×2 chroma sub-blocks (where a split mode may be the split mode S). Motion information of each 2×2 chroma sub-lock is motion information of a 4×4 luma region corresponding to the 2×2 chroma sub-block.

According to the split mode in Embodiment 5, neither a small chroma block on which intra prediction is performed, nor a transform block less than 16 pixels is generated.

Therefore, the foregoing problems in intra prediction and coefficient coding are resolved in Embodiment 5.

Embodiment 6

Step 1, step 2, step 3, step 4, and step 6 in this embodiment are the same as those in Embodiment 5.

Step 5: Parse a prediction block and residual information of a CU obtained by splitting the node A.

If it is limited that only intra prediction can be performed on each CU obtained by splitting the node A, processing is the same as that in Embodiment 5.

If it is limited that only inter prediction can be performed on each CU obtained by splitting the node A, parsing of a prediction block of a luma CB obtained by splitting the node A is the same as that in Embodiment 5.

If it is limited that only inter prediction can be performed on each CU obtained by splitting the node A, a prediction block of a chroma CB obtained by splitting the node A does not need to be parsed, a chroma prediction block and a chroma coding block have a same size, and motion information of the chroma CB is motion information for a specific preset position in a luma region corresponding to the chroma CB (e.g., the center, the bottom-right corner, or the top-left corner of the luma region).

According to the split mode in Embodiment 6, none of a small chroma block on which intra prediction is performed, a transform block of a small block, and a small chroma block on which inter prediction is generated is generated.

Embodiment 7

Step 1: Step 1 is the same as step 1 in Embodiment 4.

Step 2: Determine whether a luma block of at least one child block B in child nodes obtained by splitting the node A based on the split mode S is a 4×4 luma block (whether the width, the height, and/or the split mode of the node A, and/or the width and the height of a node B meet at least one of conditions in case 1).

If a size (that is, the width and the height) of the node A and/or the split mode S meet/meets at least one of the conditions in case 1, it is limited that intra prediction is performed on all the coding units in a coverage area of the node A; otherwise, it is determined whether a chroma block of at least one child node B in child nodes obtained by splitting the node A based on the split mode S is a small block (whether a size and/or the split mode S of the node A, and/or the width and the height of a node B meet at least one of conditions in case 2), if yes, step 3 to step 6 are performed.

Specifically, there are the following two cases for a method for determining that a chroma block of at least one child node B of the node A is a small block.

Case 1:

If one or more of the following preset conditions are true, the node A is split based on the split mode S to obtain a 4×4 luma block:

(1) the node A includes M1 pixels, and the split mode of the node A is a quadtree split. For example, M1 is 64;
(2) the node A includes M2 pixels, and the split mode of the node A is a ternary tree split. For example, M2 is 64;
(3) the node A includes M3 pixels, and the split mode of the node A is a binary tree split. For example, M3 is 32;
(4) the width of the node A is equal to four times a second threshold, the height of the node A is equal to the second threshold, and the split mode of the node A is a vertical ternary tree split;
(5) the width of the node A is equal to a second threshold, the height of the node A is equal to four times the second threshold, and the split mode of the node A is a horizontal ternary tree split;
(6) the width of the node A is equal to twice a second threshold, the height of the node A is equal to the second threshold, and the split mode of the current node is a vertical binary split;
(7) the height of the node A is equal to twice a second threshold, the width of the node A is equal to the second threshold, and the split mode of the current node is a horizontal binary split; or
(8) the width or/and the height of the node A are/is twice a second threshold, and the split mode of the node A is a quadtree split.

The size may be the width and the height of a picture region corresponding to the node A, or a quantity of luma samples included in a picture region corresponding to the node A, or an area of a picture region corresponding to the node A.

Generally, the width of the current node is the width of the luma block corresponding to the current node, and the height of the current node is the height of the luma block corresponding to the current node. In a specific implementation, for example, the second threshold may be 4.

Case 2:

(1) a chroma block of at least one child node B of the node A has a size of a 2×4 or 4×2;
(2) the width or the height of a chroma block of at least one child node B of the node A is 2;
(3) the node A includes 128 luma samples and a ternary tree split is performed on the node A, or the node A includes 64 luma samples and a binary tree split, a quadtree split, or a ternary tree split is performed on the node A;
(4) the node A includes 256 luma samples and a ternary tree split or a quadtree split is performed on the node, or the node A includes 128 luma samples and a binary tree split is performed on the node;
(5) the node A includes N1 luma samples and a ternary tree split is performed on the node A, where N1 is 64, 128, or 256;
(6) the node A includes N2 luma samples and a quadtree split is performed on the node A, where N2 is 64 or 256; or
(7) the node A includes N3 luma samples and a binary tree split is performed on the node A, where N3 is 64, 128, or 256.

It should be noted that, that the node A includes 128 luma samples may also be described as that an area of the current node is 128, or a product of the width and the height of the node A is 128. Details are not described herein.

Step 3: Step 3 is the same as step 3 in Embodiment 4.

Step 4: Determine a chroma block split mode and a luma block split mode of the node A based on a prediction mode used for the coding units in the coverage area of the node A.

If an inter prediction mode is used for all the coding units in the coverage area of the node A, a luma block and a chroma block of the node A are split based on the split mode S, to obtain child nodes of the node A and/or child nodes in the coverage area of the node A. If a 4×4 luma block is generated based on a split mode of a child node of the node A and/or a child node in the coverage area of the node A, the split mode of the child node is not allowed or the child node cannot continue to be split. For example, if the node A has a size of 8×8 and two 8×4 (or two 4×8) nodes are generated by splitting the node A in a horizontal binary tree split (or a vertical binary tree split) mode, the 8×4 (or 4×8) node continues to be split into a 4×4 block; in this case, the 8×4 (or 4×8) node cannot continue to be split.

If an intra prediction mode is used for all the coding units in the coverage area of the node A, the methods in Embodiments 4, 5, and 6 may be used as implementation methods, and details are not described herein again. For example, the luma block of the node A is split, and the chroma block of the node A is not split.

Step 5: Parse a prediction block and residual information of a CU obtained by splitting the node A.

This step is the same as step 5 in Embodiment 4, and details are not described herein again.

Step 6: Decode each CU to obtain a reconstructed signal of a picture block corresponding to the node A.

Step 6 may be implemented in a manner of step 6 in Embodiment 4, and is not further described herein.

Embodiment 8

Step 1: Step 1 is the same as step 1 in Embodiment 4.

Step 2: Determine whether a luma block of at least one child block B in child nodes obtained by splitting the node A based on the split mode S is a 4×4 luma block (whether the width, the height, and/or the split mode of the node A, and/or the width and the height of a node B meet at least one of conditions in case 1). If a size (that is, the width and the height) of the node A and/or the split mode S meet/meets at least one of the conditions in case 1, it is limited that intra prediction is performed on all the coding units in a coverage area of the node A; or it is determined whether a chroma block of at least one child node B in child nodes obtained by splitting the node A based on the split mode S is a small block (or whether a size and/or the split mode S of the node A, and/or the width and the height of the node B meet at least one of conditions in case 2, step 3 to step 6 are performed.

Specifically, there are the following two cases for a method for determining that a chroma block of at least one child node B of the node A is a small block.

Case 1:

If one or more of the following preset conditions are true, the node A is split based on the split mode S to obtain a 4×4 luma block:

(1) the node A includes M1 pixels, and the split mode of the node A is a quadtree split. For example, M1 is 64;
(2) the node A includes M2 pixels, and the split mode of the node A is a ternary tree split. For example, M2 is 128;
(3) the node A includes M3 pixels, and the split mode of the node A is a binary tree split. For example, M3 is 32;
(4) the width of the node A is equal to four times a second threshold, the height of the node A is equal to the second threshold, and the split mode of the node A is a vertical ternary tree split;
(5) the width of the node A is equal to a second threshold, the height of the node A is equal to four times the second threshold, and the split mode of the node A is a horizontal ternary tree split;
(6) the width of the node A is equal to twice a second threshold, the height of the node A is equal to the second threshold, and the split mode of the current node is a vertical binary split;
(7) the height of the node A is equal to twice a second threshold, the width of the node A is equal to the second threshold, and the split mode of the current node is a horizontal binary split; or
(8) the width or/and the height of the node A are/is twice a second threshold, and the split mode of the node A is a quadtree split.

The size may be the width and the height of a picture region corresponding to the node A, or a quantity of luma samples included in a picture region corresponding to the node A, or an area of a picture region corresponding to the node A.

Generally, the width of the current node is the width of the luma block corresponding to the current node, and the height of the current node is the height of the luma block corresponding to the current node. In a specific implementation, for example, the second threshold may be 4.

Case 2:

(1) a chroma block of at least one child node B of the node A has a size of a 2×4 or 4×2;
(2) the width or the height of a chroma block of at least one child node B of the node A is 2;
(3) the node A includes 128 luma samples and a ternary tree split is performed on the node A, or the node A includes 64 luma samples and a binary tree split, a quadtree split, or a ternary tree split is performed on the node A;
(4) the node A includes 256 luma samples and a ternary tree split or a quadtree split is performed on the node, or the node A includes 128 luma samples and a binary tree split is performed on the node;
(5) the node A includes N1 luma samples and a ternary tree split is performed on the node A, where N1 is 64, 128, or 256;
(6) the node A includes N2 luma samples and a quadtree split is performed on the node A, where N2 is 64 or 256; or
(7) the node A includes N3 luma samples and a binary tree split is performed on the node A, where N3 is 64, 128, or 256.

It should be noted that, that the node A includes 128 luma samples may also be described as that an area of the current node is 128, or a product of the width and the height of the node A is 128. Details are not described herein.

Step 3: Step 3 is the same as step 3 in Embodiment 4.

Step 4: Determine a chroma block split mode and a luma block split mode of the node A based on a prediction mode used for the coding units in the coverage area of the node A.

If an inter prediction mode is used for all the coding units in the coverage area of the node A, a luma block and a chroma block of the node A are split based on the split mode S, to obtain child nodes of the node A and/or child nodes in the coverage area of the node A. If a 4×4 luma block is generated based on a split mode of a child node of the node A and/or a child node in the coverage area of the node A, the split mode of the child node is not allowed or the child node cannot continue to be split. For example, if the node A has a size of 8×8 and two 8×4 (or two 4×8) nodes are generated by splitting the node A in a horizontal binary tree split (or a vertical binary tree split) mode, the 8×4 (or 4×8) node continues to be split into a 4×4 block; in this case, the 8×4 (or 4×8) node cannot continue to be split.

If an intra prediction mode is used for all the coding units in the coverage area of the node A, the methods in Embodiments 4, 5, and 6 may be used as implementation methods, and details are not described herein again. For example, the luma block of the node A is split, and the chroma block of the node A is not split.

Step 5: Parse a prediction block and residual information of a CU obtained by splitting the node A.

This step is the same as step 5 in Embodiment 4, and details are not described herein again.

Step 6: Decode each CU to obtain a reconstructed signal of a picture block corresponding to the node A.

Step 6 may be implemented in a manner of step 6 in Embodiment 4, and is not further described herein.

Embodiment 9

If a current region is split once to generate a 4×4 luma block (e.g., 64 luma samples are split in a QT mode, or 128 luma samples are split in a TT mode), it is limited that only an intra mode can be used for the current region by default; otherwise, a flag is transferred to indicate that only an inter mode or only an intra mode can be used for the current area.

If it is limited that only an inter mode can be used for the current region, luma and chroma are split jointly. If a node in the current region is split to generate a 4×4 luma block, this split is not allowed. For example, if the current node is 8×8 and is split in an HBT (or a VBT) mode to generate two 8×4 nodes. If these nodes continue to be split to generate 4×4 CUs, these 8×4 nodes cannot continue to be split.

If it is limited that only an intra mode can be used for the region, this implementation is the same as the original implementation (luma is split, but chroma is not split).

This illustrative example of the present invention provides a block split method, to avoid that an intra prediction mode is used for a chroma block with a comparatively small area, and facilitate pipeline processing of hardware and implementation of a decoder. In addition, in inter prediction, processes of parsing syntax elements for some prediction modes may be skipped, thereby reducing encoding complexity.

In this way, problems in coefficient coding are resolved, and coding complexity is reduced.

The block split method may be as follows:

A split mode of a node A is parsed.

It is determined whether a chroma block of at least one child node B is obtained as a small block after the node A is split based on the split mode S. (It is determined whether the width, the height, and/or the split mode of the node A, and/or the width and the height of a node B meet at least one of the foregoing conditions.)

If it is determined that a chroma block of at least one child node B is obtained as a small block after the node A is split based on the split mode S, an intra prediction mode or an inter prediction mode is used for all coding units in a coverage area of the node A.

It is determined whether to continue to split a chroma block and a luma block of the node A.

If intra prediction is performed on all the coding units in the coverage area of the node A, the luma block of the node A continues to be split based on the split mode S, and the chroma block of the node A is not further split. If inter prediction is performed on all the coding units in the coverage area of the node A, the luma block and the chroma block of the node A continue to be split based on the split mode S into N coding tree nodes including a luma block and a chroma block.

The luma block of the node A continues to be split based on the split mode S, and the chroma block of the node A is not further split. A chroma transform block and a chroma coding block have a same size.

When intra prediction is performed on all the coding units in the coverage area of the node A, a chroma prediction block and the chroma coding block have a same size; or when inter prediction is performed on all the coding units in the coverage area of the node A, a chroma prediction block is split into sub-blocks (where the sub-blocks are less than the chroma coding block), and a motion vector of each sub-block is a motion vector in a luma region corresponding to the sub-block.

The luma block of the node A is further split based on the split mode S. The chroma block of the node A is not further split. A chroma transform block corresponding to the chroma coding block and a chroma coding block have a same size, the chroma prediction block and the chroma coding block have the same size, and motion information of the chroma CB is motion information for a specific preset position in a luma region corresponding to the chroma CB.

Further illustrative examples of the present invention are provided in the following. It should be noted that the numbering used in the following section does not necessarily need to comply with the numbering used in the previous sections:

Embodiment 1. A picture partitioning method, comprising: determining a split mode of a current node, wherein the current node comprises a luma block and a chroma block; determining, based on the split mode of the current node and a size of the current node, that the chroma block of the current node is not further split; and splitting the luma block of the current node based on the split mode of the current node.

Embodiment 2. The method according to embodiment 1, wherein the determining that the chroma block of the current node is not further split comprises: when determining, based on the split mode of the current node and the size of the current node, that a child node generated by splitting the current node comprises a chroma block whose side length is less than a threshold, the chroma block of the current node is not further split.

Embodiment 3. The method according to embodiment 1, wherein when a width of the current node is equal to twice a threshold and the split mode of the current node is a vertical binary split, or when a height of the current node is equal to twice a threshold and the split mode of the current node is a horizontal binary split, or when a width of the current node is equal to four times a threshold and the split mode of the current node is a vertical ternary split, or when a height of the current node is equal to four times a threshold and the split mode of the current node is a horizontal ternary split, or when a width of the current node is equal to twice a threshold and the split mode of the current node is a quad split, the chroma block of the current node is not further split.

Embodiment 4. The method according to any one of embodiments 1 to 3, wherein the luma block of the current node is split based on the split mode of the current node, to obtain child nodes of the current node, wherein each child node comprises only a luma block.

Embodiment 5. The method according to embodiment 4, wherein the method further comprises: parsing information of the luma block of the current node, to obtain prediction information and residual information of each of sub-regions in the luma block, wherein the sub-regions one-to-one correspond to the child nodes.

Embodiment 6. The method according to embodiment 4 or 5, wherein the child nodes are not further split by default, and each child node corresponds to one coding unit comprising only a luma block.

Embodiment 7. The method according to any one of embodiments 1 to 6, wherein the method further comprises: when the chroma block of the current node is not further split, obtaining a prediction mode of the chroma block.

Embodiment 8. The method according to embodiment 7, wherein the prediction mode of the chroma block of the current node is determined based on a prediction mode of a luma block in a preset position of the current node.

Embodiment 9. The method according to embodiment 8, wherein when the prediction mode used for the luma block in the preset position is an inter prediction mode, the inter prediction mode is used for the chroma block of the current node; or a first flag is parsed to determine the prediction mode of the chroma block based on the first flag.

Embodiment 10. The method according to embodiment 9, wherein when the inter prediction mode is used for the chroma block of the current node, motion information of the luma block in the preset position is obtained as motion information of the chroma block; or the chroma block is split into chroma prediction sub-blocks, and motion information of the chroma prediction sub-blocks is obtained.

Embodiment 11. The method according to embodiment 9, wherein when it is determined, based on the first flag, that an intra prediction mode is used for the chroma block, an intra prediction mode is parsed from the bitstream and used as the intra prediction mode of the chroma block; when it is determined, based on the first flag, that the inter prediction mode is used for the chroma block, motion information of the luma block in the preset position is obtained as motion information of the chroma block; or when it is determined, based on the first flag, that the inter prediction mode is used for the chroma block, the chroma block is split into chroma prediction sub-blocks, and motion information of the chroma prediction sub-blocks is obtained.

Embodiment 12. The method according to embodiment 10 or 11, wherein that motion information of the chroma prediction sub-blocks is obtained comprises: if inter prediction is performed on luma blocks in luma picture positions corresponding to the chroma prediction sub-blocks, motion information in the luma picture positions corresponding to the chroma prediction sub-blocks is used as the motion information of the chroma prediction sub-blocks; otherwise, motion information in the preset position is used as the motion information of the chroma prediction sub-blocks.

Embodiment 13. The method according to embodiment 8, wherein when the prediction mode used for the luma block in the preset position is an intra prediction mode, the intra prediction mode is used for the chroma block of the current node.

Embodiment 14. The method according to embodiment 13, wherein an intra prediction mode is parsed from the bitstream as the intra prediction mode of the chroma block of the current node; or the intra prediction mode of the chroma block of the current node is one of a direct current mode, a planar mode, an angular mode, a cross-component linear model mode, or a chroma derived DM mode.

Embodiment 15. The method according to embodiment 8, wherein when the prediction mode used for the luma block in the preset position is an intra block copy (IBC) mode, the IBC prediction mode is used for the chroma block of the current node; or a second flag is parsed to determine the prediction mode of the chroma block based on the second flag.

Embodiment 16. The method according to embodiment 15, wherein when the IBC prediction mode is used for the chroma block of the current node, the method further comprises: obtaining displacement vector information of the luma block in the preset position as displacement vector information of the chroma block of the current node.

Embodiment 17. The method according to embodiment 15, wherein the IBC mode is used for the chroma block if a value of the second flag is a first value; an intra prediction mode is used for the chroma block if a value of the second flag is a first value; or an inter prediction mode is used for the chroma block if a value of the second flag is a second value.

Embodiment 18. The method according to embodiment 7, wherein the method further comprises: obtaining a prediction mode of a plurality of luma blocks obtained through splitting; and determining the prediction mode of the chroma block of the current node based on the prediction mode of the plurality of luma blocks obtained through splitting.

Embodiment 19. The method according to embodiment 18, wherein when the prediction mode used for the plurality of luma blocks is an intra prediction mode, the intra prediction mode is used for the chroma block of the current node.

Embodiment 20. The method according to embodiment 18, wherein when the prediction mode used for the plurality of luma blocks is an inter prediction mode, motion information of a luma block in a preset position is used as motion information of the chroma block of the current node when the inter prediction mode is used for the chroma block of the current node; or when the prediction mode used for the plurality of luma blocks is an inter prediction mode, a first flag is parsed to determine the prediction mode of the chroma block based on the first flag.

Embodiment 21. The method according to embodiment 20, wherein when it is determined, based on the first flag, that an intra prediction mode is used for the chroma block, an intra prediction mode is parsed from the bitstream and used as the intra prediction mode of the chroma block; or when it is determined, based on the first flag, that the inter prediction mode is used for the chroma block, motion information of a luma block in a preset position is obtained as motion information of the chroma block.

Embodiment 22. The method according to embodiment 18, wherein when the prediction mode used for the plurality of luma blocks comprises an inter prediction mode and an intra prediction mode, a prediction mode of a luma block in a preset position of the current node is obtained as the prediction mode of the chroma block of the current node.

Embodiment 23. The method according to any one of embodiments 1 to 22, wherein if the current node is an I-frame, the intra prediction mode is used for each child node of the current node; or if the current node is a P-frame or a B-frame, a first child node is parsed to obtain a prediction mode of the first child node, wherein a prediction mode of remaining child nodes is the same as the prediction mode of the first child node, and the first child node is a node that is first parsed.

Embodiment 24. The method according to any one of embodiments 1 to 22, wherein if the current node is an I-frame, the intra prediction mode is used for each child node of the current node; or if the current node is a P-frame or a B-frame, the inter prediction mode is used for each child node of the current node.

Embodiment 25. The method according to any one of embodiments 1 to 24, wherein determining, based on the split mode of the current node, the size of the current node, and the prediction mode of a first child node of the current node, that the chroma block of the current node is not further split, wherein the first child node comprises only a luma block, and the first child node is the node that is first parsed.

Embodiment 26. The method according to embodiment 25, wherein determining, based on the split mode of the current node and the size of the current node, that the child node generated by splitting the current node comprises a chroma block whose side length is less than a threshold, and the prediction mode of the first child node is the intra prediction mode, the chroma block of the current node is not further split.

Embodiment 27. The method according to embodiment 26, wherein when the prediction mode of the first child node is intra prediction and any one of the following conditions is true: when the width of the current node is equal to twice the threshold and the split mode of the current node is the vertical binary split, or when the height of the current node is equal to twice the threshold and the split mode of the current node is the horizontal binary split, or when the width of the current node is equal to four times the threshold and the split mode of the current node is the vertical ternary split, or when the height of the current node is equal to four times the threshold and the split mode of the current node is the horizontal ternary split, or when the width of the current node is equal to twice the threshold and the split mode of the current node is the quad split, the chroma block of the current node is not further split.

Embodiment 28. The method according to any one of embodiments 1 to 24, wherein determining, based on the split mode of the current node and the size of the current node, that the child node generated by splitting the current node comprises the chroma block whose side length is less than the threshold; if the prediction mode of a first child node is inter prediction, the chroma block of the current node is split based on the split mode of the current node, wherein the first child node is a node that is first parsed.

Embodiment 29. The method according to embodiment 28, wherein the method further comprises: determining motion information of a corresponding child node of the chroma block based on motion information of the child nodes of the current node.

For example, it should be understood that disclosed content with reference to a described method may also hold true for a corresponding device or system configured to perform the method and vice versa. For example, if one or more specific method steps are described, a corresponding device may include one or more units such as functional units, to perform the described one or more method steps (e.g., one unit performing the one or more steps; or a plurality of units each performing one or more of the plurality of steps), even if such one or more units are not explicitly described or illustrated in the accompanying drawings. In addition, for example, if a specific apparatus is described based on one or more units such as functional units, a corresponding method may include one step to perform functionality of one or more units (e.g., one step to perform the functionality of the one or more units, or a plurality of steps each of which is used to perform the functionality of one or more of the plurality of units), even if such one or more steps are not explicitly described or illustrated in the accompanying drawings. Further, it should be understood that features of the example embodiments and/or aspects described in this specification may be combined with each other, unless specifically noted otherwise.

In one or more examples, the described functions may be implemented by hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, for example, according to a communication protocol. In this manner, the computer-readable medium may usually correspond to (1) non-transitory tangible computer-readable storage media or (2) a communication medium such as a signal or carrier wave. The data storage medium may be any available medium that can be accessed by one or more computers or one or more processors to retrieve instructions, code, and/or data structures for implementation of the technologies described in the present disclosure. A computer program product may include a computer-readable medium.

By way of example but not limitation, such type of computer-readable storage media can include a RAM, a ROM, an EEPROM, a CD-ROM or another optical disk storage, a magnetic disk storage or another magnetic storage device, a flash memory, or any other medium that can be used to store desired program code in a form of instructions or data structures and that can be accessed by a computer. In addition, any connection is appropriately referred to as a computer-readable medium. For example, if instructions are transmitted from a website, server, or another remote source by using a coaxial cable, a fiber optic cable, a twisted pair, a digital subscriber line (DSL), or wireless technologies such as infrared, radio, and microwave, the coaxial cable, the fiber optic cable, the twisted pair, the DSL, or the wireless technologies such as infrared, radio, and microwave are included in a definition of medium. However, it should be understood that computer-readable storage medium and the data storage medium do not include a connection, a carrier wave, a signal, or another transitory medium, but are actually directed to non-transitory tangible storage media. As used in this specification, a disk and an optical disc include a compact disc (CD), a laser disc, an optical disc, a digital versatile disc (DVD), a soft disk, and a Blu-ray disc. The disk generally reproduces data magnetically, while the optical disc reproduces the data optically with a laser. A combination of the above should also be included within the scope of the computer-readable media.

The instructions may be executed by one or more processors, such as one or more digital signal processors (DSP), general purpose microprocessors, application-specific integrated circuits (ASIC), field programmable logic arrays (FPGA), or other equivalent integrated or discrete logic circuitry. Therefore, the term "processor" used in this specification may represent any one of the foregoing structures or another structure that is applicable to implement the technologies described in this specification. In addition, in some aspects, the functionality described in this specification may be provided within dedicated hardware and/or software modules configured for encoding and decoding, or incorporated in a combined codec. In addition, the technologies may be all implemented in one or more circuits or logic elements.

The technologies of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed technologies, but do not necessarily require achievement by different hardware units. Exactly, as described above, the units may be combined in a codec hardware unit or provided by a collection of interoperative hardware units including one or more processors as described above, in conjunction with appropriate software and/or firmware.

What is claimed is:

1. A picture partitioning method for use in video coding, comprising:
    determining a split mode of a current node that comprises a luma block and a chroma block, and wherein the current node is a node in a coding tree;
    determining that the chroma block of the current node is not split and becomes a coding unit including only a chroma block based on:
        a data format of the current node, the data format of the current node being YUV4:2:0 or YUV4:2:2,
        the split mode of the current node, and
        a size of the current node; and
    splitting the luma block of the current node based on the split mode of the current node to obtain child nodes of the current node, wherein each child node comprises only a luma block.

2. The method according to claim 1, wherein the determining that the chroma block of the current node is not split comprises:
    determining that the chroma block of the current node is not split, in accordance with the data format of the current node being YUV4:2:0 or YUV4:2:2, a width of the current node being equal to four times a threshold and the split mode of the current node being a vertical ternary split, wherein the threshold is 4.

3. The method according to claim 1, wherein the determining that the chroma block of the current node is not split comprises:
    determining that the chroma block of the current node is not split, in accordance with the data format of the current node being YUV4:2:0 or YUV4:2:2, a width of the current node being equal to twice a threshold and the split mode of the current node being a vertical binary split, wherein the threshold is 4.

4. The method according to claim 1, wherein the determining that the chroma block of the current node is not split comprises:
    determining that the chroma block of the current node is not split, in accordance with the data format of the current node being YUV4:2:0 or YUV4:2:2, a height of the current node being equal to four times a threshold and the split mode of the current node being a horizontal ternary split, wherein the threshold is 4.

5. The method according to claim 1, wherein the determining that the chroma block of the current node is not split comprises:
    determining that the chroma block of the current node is not split, in accordance with the data format of the current node being YUV4:2:0 or YUV4:2:2, a height of the current node being equal to twice a threshold and the split mode of the current node being a horizontal binary split, wherein the threshold is 4.

6. The method according to claim 1, wherein a node prediction mode identifier is parsed from a bitstream, wherein the node prediction mode identifier indicates a prediction mode to be performed on all coding units in a coverage area of the current node, wherein the prediction mode indicated by the node prediction identifier is either intra prediction mode or inter prediction mode.

7. The method according to claim 6, wherein:
    inter prediction is performed on all the coding units in the coverage area of the current node in accordance with a value of the prediction mode identifier being 0;
    intra prediction is performed on all the coding units in the coverage area of the current node in accordance with a value of the prediction mode identifier being 1.

8. A video stream coding apparatus, comprising:
    a non-transitory computer-readable storage medium storing instructions; and
    one or more processors in communication with the medium and upon execution of the instructions, configured to carry out the method comprising:
        determining a split mode of a current node that comprises a luma block and a chroma block, and wherein the current node is a node in a coding tree;
        determining that the chroma block of the current node is not split and becomes a coding unit including only a chroma block based on:
            a data format of the current node, the data format of the current node being YUV4:2:0 or YUV4:2:2,
            the split mode of the current node, and
            a size of the current node; and
        splitting the luma block of the current node based on the split mode of the current node to obtain child nodes of the current node, wherein each child node comprises only a luma block.

9. The apparatus according to claim 8, wherein the determining that the chroma block of the current node is not split comprises:
    determining that the chroma block of the current node is not split, in accordance with the data format of the current node being YUV4:2:0 or YUV4:2:2, a width of the current node being equal to four times a threshold and the split mode of the current node being a vertical ternary split, wherein the threshold is 4.

10. The apparatus according to claim 8, wherein the determining that the chroma block of the current node is not split comprises:
    determining that the chroma block of the current node is not split, in accordance with the data format of the current node being YUV4:2:0 or YUV4:2:2, a width of the current node being equal to twice a threshold and the split mode of the current node being a vertical binary split, wherein the threshold is 4.

11. The apparatus according to claim 8, wherein the determining that the chroma block of the current node is not split comprises:
    determining that the chroma block of the current node is not split, in accordance with the data format of the current node being YUV4:2:0 or YUV4:2:2, a height of the current node being equal to four times a threshold and the split mode of the current node being a horizontal ternary split, wherein the threshold is 4.

12. The apparatus according to claim 8, wherein the determining that the chroma block of the current node is not split comprises:
    determining that the chroma block of the current node is not split, in accordance with the data format of the current node being YUV4:2:0 or YUV4:2:2, a height of the current node being equal to twice a threshold and the split mode of the current node being a horizontal binary split, wherein the threshold is 4.

13. The apparatus according to claim 8, wherein a node prediction mode identifier is parsed from a bitstream, wherein the node prediction mode identifier indicates a prediction mode to be performed on all coding units in a coverage area of the current node, wherein the prediction mode indicated by the node prediction identifier is either intra prediction mode or inter prediction mode.

14. The apparatus according to claim 13, wherein:
    inter prediction is performed on all the coding units in the coverage area of the current node in accordance with a value of the prediction mode identifier being 0;

intra prediction is performed on all the coding units in the coverage area of the current node in accordance with a value of the prediction mode identifier being 1.

15. A non-transitory computer-readable storage medium comprising a bitstream decoded by performing a method comprising the operations of:
   determining a split mode of a current node that comprises a luma block and a chroma block, and wherein the current node is a node in a coding tree;
   determining that the chroma block of the current node is not split and becomes a coding unit including only a chroma block based on:
      a data format of the current node, the data format of the current node being YUV4:2:0 or YUV4:2:2,
      the split mode of the current node, and
      a size of the current node; and
   splitting the luma block of the current node based on the split mode of the current node to obtain child nodes of the current node, wherein each child node comprises only a luma block.

16. The storage medium according to claim 15, wherein the determining that the chroma block of the current node is not split comprises:
   determining that the chroma block of the current node is not split, in accordance with the data format of the current node being YUV4:2:0 or YUV4:2:2, a width of the current node being equal to four times a threshold and the split mode of the current node being a vertical ternary split, wherein the threshold is 4.

17. The storage medium according to claim 15, wherein the determining that the chroma block of the current node is not split comprises:
   determining that the chroma block of the current node is not split, in accordance with the data format of the current node being YUV4:2:0 or YUV4:2:2, a width of the current node being equal to twice a threshold and the split mode of the current node being a vertical binary split, wherein the threshold is 4.

18. The storage medium according to claim 15, wherein the determining that the chroma block of the current node is not split comprises:
   determining that the chroma block of the current node is not split, in accordance with the data format of the current node being YUV4:2:0 or YUV4:2:2, a height of the current node being equal to four times a threshold and the split mode of the current node being a horizontal ternary split, wherein the threshold is 4.

19. The storage medium according to claim 15, wherein the determining that the chroma block of the current node is not split comprises:
   determining that the chroma block of the current node is not split, in accordance with the data format of the current node being YUV4:2:0 or YUV4:2:2, a height of the current node being equal to twice a threshold and the split mode of the current node being a horizontal binary split, wherein the threshold is 4.

20. The storage medium according to claim 19, wherein a node prediction mode identifier is parsed from a bitstream, wherein the node prediction mode identifier indicates a prediction mode to be performed on all coding units in a coverage area of the current node, wherein the prediction mode indicated by the node prediction identifier is either intra prediction mode or inter prediction mode.

* * * * *